United States Patent
Gautama et al.

(10) Patent No.: US 9,008,917 B2
(45) Date of Patent: Apr. 14, 2015

(54) METHOD AND SYSTEM FOR DETECTING PROXIMITY OF AN END DEVICE TO A VEHICLE BASED ON SIGNAL STRENGTH INFORMATION RECEIVED OVER A BLUETOOTH LOW ENERGY (BLE) ADVERTISING CHANNEL

(71) Applicant: GM Global Technology Operations LLC, Detroit, MI (US)

(72) Inventors: Neeraj R. Gautama, Whitby (CA); Amanda J. Kalhous, Ajax (CA); Robert A. Hrabak, West Bloomfield, MI (US); Norman J. Weigert, Whitby (CA)

(73) Assignee: GM Global Technology Operations LLC, Detroit, MI (US)

( * ) Notice: Subject to any disclaimer, the term of this patent is extended or adjusted under 35 U.S.C. 154(b) by 168 days.

(21) Appl. No.: 13/728,882

(22) Filed: Dec. 27, 2012

(65) Prior Publication Data

US 2014/0188348 A1    Jul. 3, 2014

(51) Int. Cl.
*B60R 25/00*    (2013.01)
*B60W 10/30*    (2006.01)
(Continued)

(52) U.S. Cl.
CPC ............ *B60W 10/30* (2013.01); *B60W 10/08* (2013.01); *B60W 2600/00* (2013.01); *B60W 50/00* (2013.01)

(58) Field of Classification Search
CPC . B60W 10/30; B60W 50/00; B60W 2600/00; B60W 10/08; B60R 25/00; G06C 2209/63
USPC ........................................... 701/48; 455/41.2
See application file for complete search history.

(56) References Cited

U.S. PATENT DOCUMENTS 8,421,612 B2 *  4/2013  Sugiura ........................ 340/447
8,447,467 B2 *  5/2013  Nishikawa et al. ............. 701/36
(Continued)

FOREIGN PATENT DOCUMENTS

DE    10046698 A1    5/2002
DE    10338823 A1    3/2005
(Continued)

OTHER PUBLICATIONS

John Leonard, Bluetooth Low Energy, Apr. 2010, Nordic Semiconductor, at least p. 8.*

(Continued)

*Primary Examiner* — John Q Nguyen
*Assistant Examiner* — Nadeem Odeh
(74) *Attorney, Agent, or Firm* — Ingrassia Fisher & Lorenz, P.C.

(57) ABSTRACT

A passive entry passive start (PEPS) system is provided for performing at least one PEPS function with respect to a vehicle as an end device (e.g., smart phone or key fob, etc.) approaches the vehicle and comes within range for authorization. The vehicle includes a plurality of sensors and a central module. The central module is communicatively coupled to the end device and to the sensors via short-range wireless connections. The central module can determine, based on signal strength information provided from the sensors or the end device, whether the end device is within range for authorization. When the end device is determined to be within range for authorization, the central module can control performance of at least one PEPS function at the vehicle.

19 Claims, 13 Drawing Sheets

(51) Int. Cl.
*B60W 10/08* (2006.01)
*B60W 50/00* (2006.01)

(56) References Cited

U.S. PATENT DOCUMENTS

| | | | |
|---|---|---|---|
| 8,744,482 B2* | 6/2014 | Margalef et al. | 455/456.1 |
| 2006/0114100 A1* | 6/2006 | Ghabra et al. | 340/5.61 |
| 2007/0216517 A1* | 9/2007 | Kurpinski et al. | 340/5.72 |
| 2009/0096578 A1* | 4/2009 | Ogino et al. | 340/5.72 |
| 2009/0136035 A1* | 5/2009 | Lee | 380/270 |
| 2009/0153317 A1* | 6/2009 | Kim | 340/447 |
| 2012/0244877 A1* | 9/2012 | Margalef et al. | 455/456.1 |

FOREIGN PATENT DOCUMENTS

| | | |
|---|---|---|
| DE | 10360418 A1 | 7/2005 |
| DE | 102006038923 A1 | 3/2007 |
| EP | 0491095 A1 | 6/1992 |

OTHER PUBLICATIONS

German Patent and Trade Mark Office, Office Action in German Patent Application No. 10 2013 224 330.8, mailed Sep. 15, 2014.

* cited by examiner

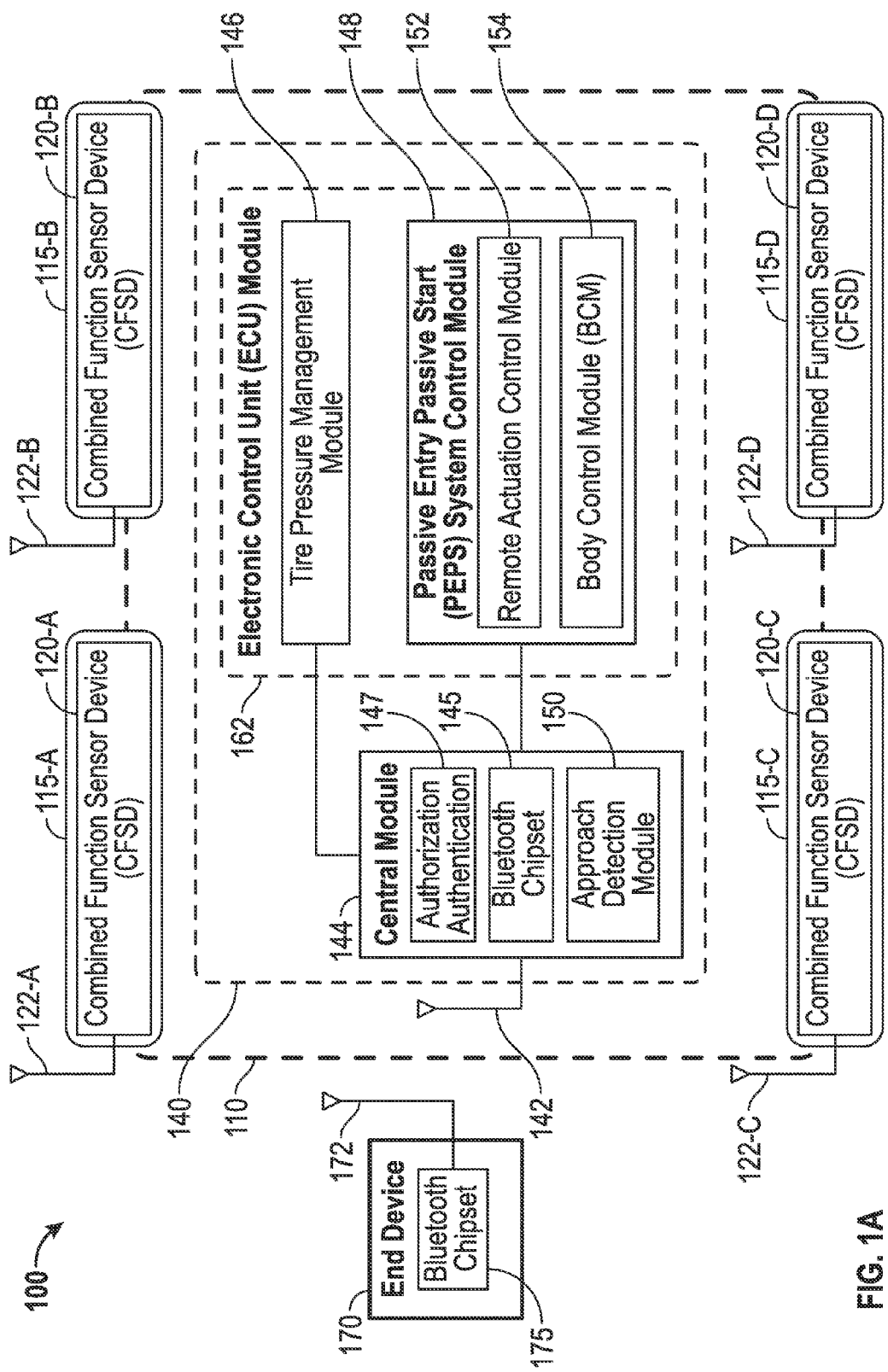

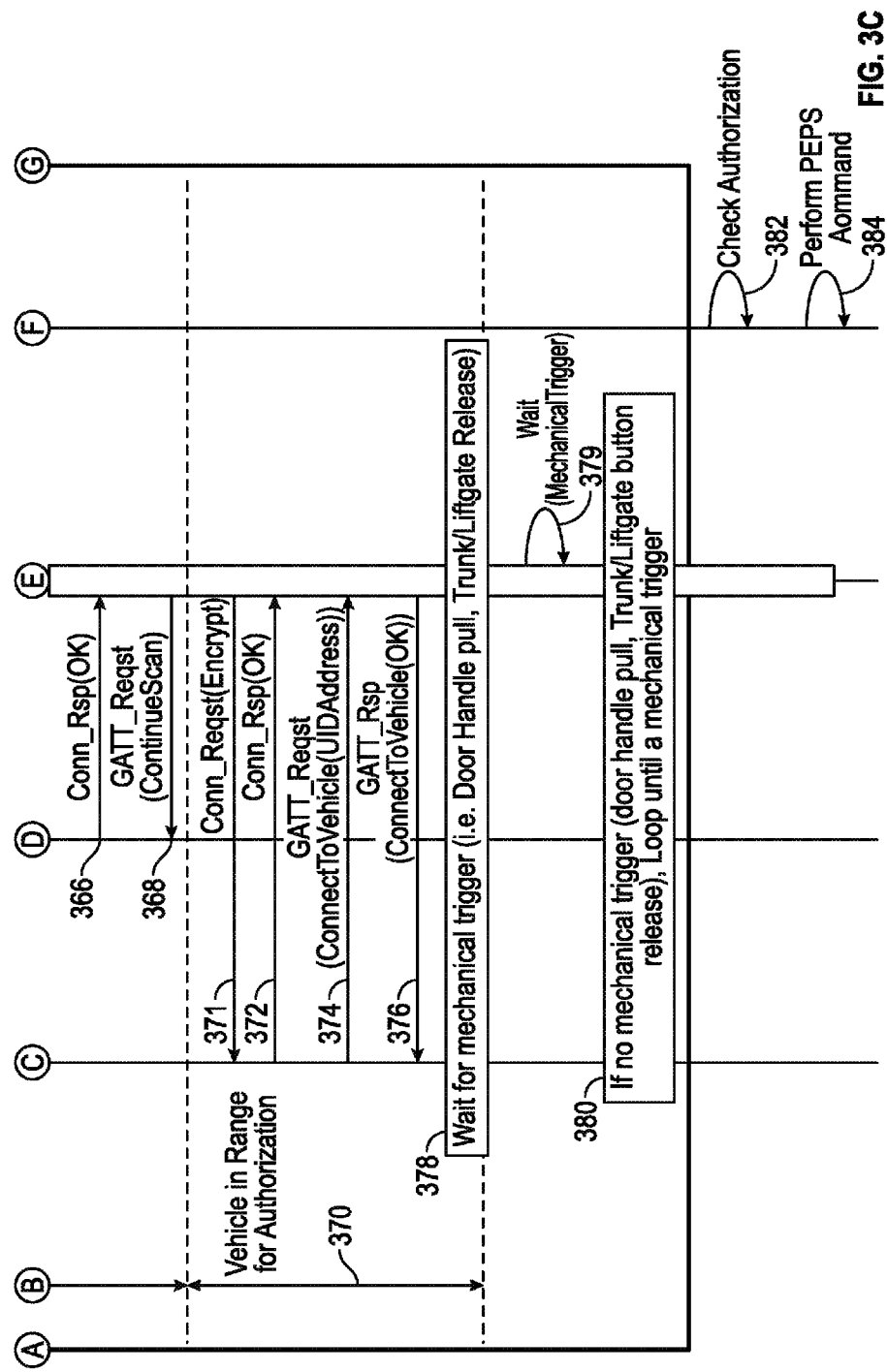

| Frequency | LL |   |
|---|---|---|
| 2402 MHz | 37 | 410-A |
| 2404 MHz | 0 | |
| 2406 MHz | 1 | |
| 2408 MHz | 2 | |
| 2410 MHz | 3 | |
| 2412 MHz | 4 | |
| 2414 MHz | 5 | |
| 2416 MHz | 6 | |
| 2418 MHz | 7 | |
| 2420 MHz | 8 | |
| 2422 MHz | 9 | |
| 2424 MHz | 10 | |
| 2426 MHz | 38 | 410-B |
| 2428 MHz | 11 | |
| 2430 MHz | 12 | |
| 2432 MHz | 13 | |
| 2434 MHz | 14 | |
| 2436 MHz | 15 | |
| 2438 MHz | 16 | |
| 2440 MHz | 17 | |
| 2442 MHz | 18 | |
| 2444 MHz | 19 | |
| 2446 MHz | 20 | |
| 2448 MHz | 21 | |
| 2450 MHz | 22 | |
| 2452 MHz | 23 | |
| 2454 MHz | 24 | |
| 2456 MHz | 25 | |
| 2458 MHz | 26 | |
| 2460 MHz | 27 | |
| 2462 MHz | 28 | |
| 2464 MHz | 29 | |
| 2466 MHz | 30 | |
| 2468 MHz | 31 | |
| 2470 MHz | 32 | |
| 2472 MHz | 33 | |
| 2474 MHz | 34 | |
| 2476 MHz | 35 | |
| 2478 MHz | 36 | |
| 2480 MHz | 39 | 410-C |

FIG. 6

METHOD AND SYSTEM FOR DETECTING PROXIMITY OF AN END DEVICE TO A VEHICLE BASED ON SIGNAL STRENGTH INFORMATION RECEIVED OVER A BLUETOOTH LOW ENERGY (BLE) ADVERTISING CHANNEL

TECHNICAL FIELD

The technical field generally relates to vehicles, and more particularly relates to Passive Entry Passive Start (PEPS) systems and detecting proximity of an end device to a vehicle.

BACKGROUND

A passive entry passive start system allows a driver, or anyone who possesses an authorized key fob, to unlock a vehicle's doors as they approach the vehicle without touching a key fob. Once the key fob is within range of the vehicle (e.g., 1 m) locked doors can be open by pulling a door handle. In addition, some PEPS systems can be configured to automatically start the vehicle's engine as an authorized key fob approaches the vehicle. Other PEPS systems require that the driver pushes an ignition button to start and/or stop the vehicle engine.

PEPS systems typically require multiple low frequency (LF) (e.g., 125 kHz) transmitting antennas both inside and outside the vehicle. External antennas can be located in the door handles. In one PEPS system, the key fob detects the low-power signal emitted from the vehicle, and automatically responds by emitting a key code or other identifier. A receiver in the vehicle receives the key code (or other identifier) and sends it to an electronic control unit (ECU). If the key code (or other identifier) is confirmed, the key fob is "authorized," and the ECU unlocks the doors when the driver touches or pulls on a door handle. To start the vehicle engine, the driver simply pushes an ignition button. The ECU allows the engine to start only when the key fob is detected within the cabin of the vehicle and the key code is confirmed again.

Integration of these antennas and other hardware and wiring needed to implement a PEPS system is costly, and it is always desirable to reduce the cost of vehicles that include such PEPS systems.

In some PEPS systems, system reaction time can be a problem since the key fob must be in close proximity (e.g., within three feet) to the vehicle for it to work. For example, in some conventional PEPS systems, it is often required that an authorized challenge occur within 1 to 3 meters of the vehicle for authentication purposes. In many cases there are delays in a conventional system that can prevent this authorized challenge from completing as the driver begins pulling on the door handle. As a result, the driver may pull the door handle before the door is unlocked. The driver must then release the handle and pull it again for the door to open. It would be desirable to provide a PEPS system that avoids this problem.

In addition, some PEPS systems are insecure and susceptible to relay station attacks. In some cases, the vehicle can be unlocked and/or started without the driver intending the same. As such, it would be desirable to provide more secure PEPS systems that employ more sophisticated security mechanisms.

Another problem that arises in PEPS systems is that in some cases, the key fob is unavailable or does not work. For example, the driver can lose their key fob, or inadvertently lock it in their vehicle. In addition, the key fob authorization process requires that the key fob is operable and can communicate with the vehicle. In such cases, it would be desirable to provide a backup method of unlocking and starting the vehicle.

Accordingly, it is desirable to improved PEPS systems that can help resolve one or more of the drawbacks mentioned above. Furthermore, other desirable features and characteristics of the present invention will become apparent from the subsequent detailed description and the appended claims, taken in conjunction with the accompanying drawings and the foregoing technical field and background.

SUMMARY

In one embodiment, a passive entry passive start (PEPS) system is provided for performing at least one passive entry passive start (PEPS) function with respect to a vehicle as an end device (e.g., smart phone or key fob, etc.) approaches the vehicle and comes within range for authorization. The vehicle includes a plurality of sensors and a central module. In one non-limiting implementation, the sensors can be integrated into the tires of vehicle and also provide tire pressure monitoring capability. The central module is communicatively coupled to the end device and to the sensors via short-range wireless connections. The central module can determine, based on signal strength information provided from the sensors or the end device, whether the end device is within range for authorization. For example, in one implementation, the central module can determine, based on the signal strength information provided from the sensors or the end device, a distance of the end device from the vehicle and can then determine whether the end device is within the range for authorization based on the distance of the end device from the vehicle. When the end device is determined to be within range for authorization, the central module can control performance of at least one passive entry passive start (PEPS) function at the vehicle.

In some embodiments, the central module can perform a filtered scan for an advertisement message transmitted from the end device over an advertising channel, and, when the end device detected during scanning, can transmit a discovery message to each of the sensors that indicates that the sensors are to being scanning for a first advertisement message transmitted from the end device over an advertising channel. In turn, each sensor can determine signal strength information for the first advertisement message, and then transmit a reporting message to the central module that comprises the signal strength information and a first address for the end device. In these embodiments, the central module can determine the distance of the end device from the vehicle based on the signal strength information from the reporting messages received from the sensors. In some embodiments, when the end device is determined to be within range for authorization, the central module is configured to initiate an authorization process with the end device by exchanging messages over a data channel with the end device. In some embodiments, the advertising channels are connectionless and do not require a connection be established for communications to take place over the advertising channels, whereas the data channel is connection-oriented such that a connection must be established before communications take place over the data channel.

In another embodiment, the sensors are configured to transmit advertisement messages over an advertising channel, and the end device performs a filtered scan for advertisement messages transmitted from the sensors over an advertising channel, and, upon receipt, can determine signal strength information from the advertisement messages. The end device can then transmit a reporting message to the central module that comprises the signal strength information corresponding to each sensor. As above, the central module can then determine, based on signal strength information provided in the reporting message from the end device, a distance of the end device from the vehicle and whether the end device is within range for authorization based on the distance of the end device from the vehicle.

In another embodiment, a method is provided for controlling a vehicle that includes a central module and a plurality of sensors. In accordance with the method, the central module disposed within a vehicle can determine, based on signal strength information, whether the end device is within range for authorization. When the end device is determined to be within range for authorization, at least one passive entry passive start (PEPS) function can then be performed at the vehicle.

In accordance with some embodiments of the method, prior to determining the distance of the end device from the vehicle, steps (a) through (h) can be performed as follows. At step (a), wireless connections can be established between the central module and the sensors during an initial wireless connection setup phase. At step (b), the central module can then perform a filtered scan for an advertisement message transmitted from the end device (that includes a first address for the end device) over an advertising channel. When the central module receives an advertisement message from the end device, at step (c) the central module can then communicate to each of the sensors, a discovery message that indicates that the end device detected and that the sensors are to being scanning for communications from the end device. Each discovery message comprises the first address for the end device that was discovered during the filtered scan. In accordance with some embodiments of the method, each of the sensors can switch from a peripheral role to an observer role. At step (d), each of the sensors can then perform a filtered scan for a first advertisement message transmitted from the end device over an advertising channel. The first advertisement message includes the first address for the end device.

Any of the sensors that receive the first advertisement message from the end device can then determine signal strength information for the first advertisement message at step (e1), and generate and transmit a reporting message that comprises the signal strength information and the first address for the end device at step (e2). In accordance with some embodiments of the method, prior to transmitting the reporting message, each of the sensors can switch from the observer role to the peripheral role. Meanwhile, at step (f), the central module performs another filtered scan for the reporting message(s) (that include the first address for the end device) transmitted from the sensors, and at step (g) waits to receive one or more of the reporting messages. At step (h), the central module can process the signal strength information from each of the reporting messages to determine the distance of the end device from the vehicle and optionally a direction that the end device is approaching the vehicle from. In accordance with some embodiments of the method, the reporting messages transmitted from the sensors are general advertisement messages transmitted from the sensors over an advertising channel, whereas in accordance with some other embodiments of the method, the reporting messages transmitted from the sensors are Generic Attribute Profile (GATT) messages transmitted from the sensors over a data channel.

In accordance with some embodiments of the method, after the central module determines that the end device is within range for authorization, the central module can transmit wireless connection request messages to each of the sensors, and upon receiving one of the wireless connection request messages, each of the sensors respond by transmitting a wireless connection response message back to the central module to acknowledge that a wireless connection has been established between that particular sensor and the central module.

In accordance with some embodiments of the method, the central module can also transmit a connection request message to the end device over an advertising channel to request a wireless connection to the vehicle, and the end device can respond by transmitting a connection response message to the central module over an advertising channel to confirm that the end device is connected to the vehicle via the wireless connection.

When the end device is determined to be within range for authorization, the central module can initiate an authorization process with the end device by exchanging GATT messages over a data channel with the end device. In accordance with some embodiments of the method, initiating the authorization process comprises the steps of: transmitting, from the end device to the central module, a GATT request message over a data channel to initiate a passive entry passive start function; and transmitting, from the central module to the end device, a GATT response message over a data channel to confirm that the end device is connected to the central module. A timer is then started at the central module that specifies a timeout period that the central module will wait for a trigger event to occur. When the trigger event occurs within the timeout period specified by the timer, an electronic control unit (ECU) of the vehicle determines whether the end device is authorized to access the vehicle. Upon determining that the end device is authorized to access the vehicle, the ECU can execute processing to cause the at least one PEPS function to be performed to allow for vehicle access. When the trigger event does not occur within the timeout period specified by the timer, authorization is cancelled at the central module.

In accordance with some embodiments of the method, t any of the advertising channel(s) are connectionless and do not require a connection be established for communications to take place over that advertising channel, and such that any of the data channel(s) is connection-oriented such that a connection must be established before communications take place over that data channel.

DESCRIPTION OF THE DRAWINGS

The exemplary embodiments will hereinafter be described in conjunction with the following drawing figures, wherein like numerals denote like elements, and wherein:

FIG. 1A is a block diagram that illustrates a system that includes a vehicle and an end device in accordance with the disclosed embodiments;

FIGS. 3A through 3C illustrate a method in accordance with some of the disclosed embodiments;

FIG. 6 is a diagram that provides a mapping of radio frequency (RF) channels to BLUETOOTH® Low Energy (BLE) data channels and BLE advertising channels.

DETAILED DESCRIPTION

Figure 1B:
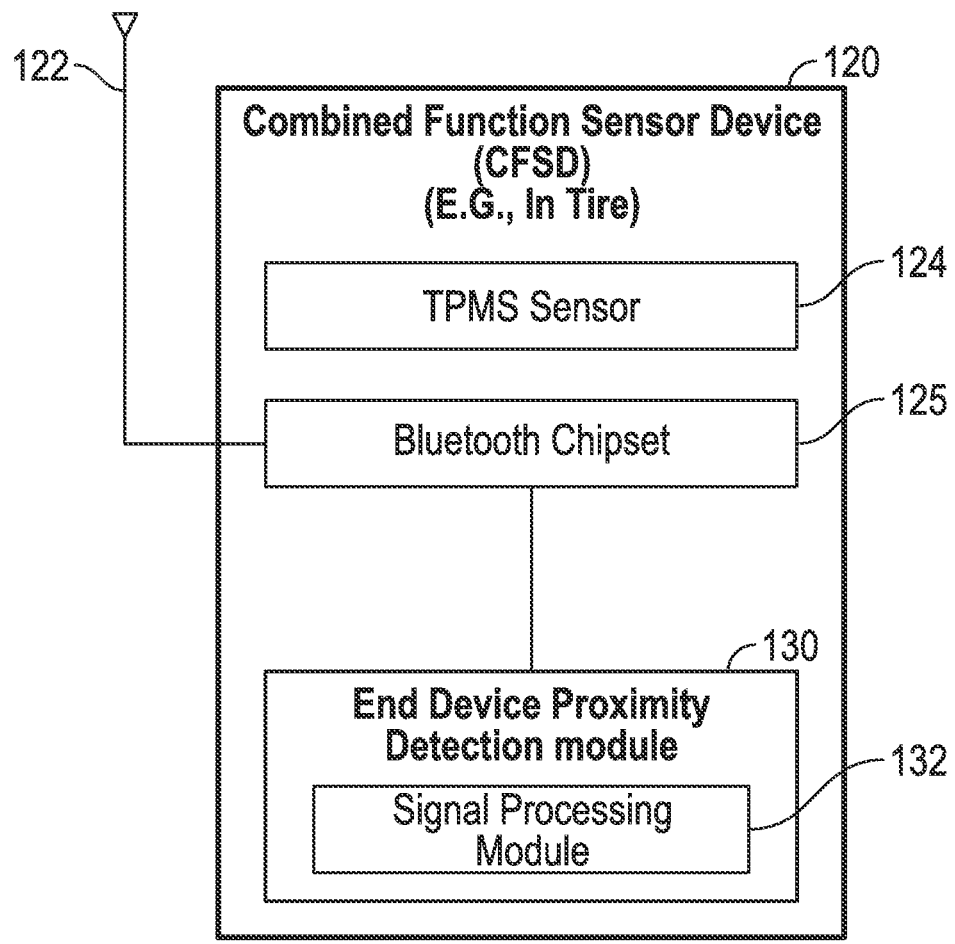
FIG. 1B is a block diagram of a combined function sensor device in accordance with one embodiment.

The following detailed description is merely exemplary in nature and is not intended to limit the application and uses. Furthermore, there is no intention to be bound by any expressed or implied theory presented in the preceding technical field, background, brief summary or the following detailed description.

FIG. 1A illustrates a system 100 that includes a vehicle 110 and an end device 170 in accordance with the disclosed embodiments.

The end device 170 is a BLUETOOTH®-enabled device. The end device 170 includes a BLUETOOTH® antenna 172 and a BLUETOOTH® chipset 175, and is capable of implementing all known BLUETOOTH® standards and protocols including a BLUETOOTH® Low Energy (BLE) protocol. BLUETOOTH® technical specifications are developed and published by the BLUETOOTH® Special Interest Group (SIG). BLUETOOTH® Core Specification Version 4.0, adopted Jun. 30, 2010, Core Specification Supplement (CSS) v1 adopted Dec. 27, 2011, Core Specification Addendum (CSA) 2 adopted Dec. 27, 2011, Core Specification Supplement (CSS) v2 adopted Jul. 24, 2012, and Core Specification Addendum (CSA) 3 adopted Jul. 24, 2012, describe various features of the BLE standards, and are incorporated by reference herein in their entirety. Copies of any of the incorporated Core Specifications, including the BLUETOOTH® Specification Version 4.0, can be obtained from the BLUETOOTH® Special Interest Group (SIG) by contacting them in writing at BLUETOOTH® Special Interest Group, 5209 Lake Washington Blvd NE, Suite 350, Kirkland, Wash. 98033, USA, or by visiting their website and downloading a copy. BLUETOOTH® Core Specification Version 4.0 includes Classic BLUETOOTH®, BLUETOOTH® High Speed (HS) protocols and BLUETOOTH® Low Energy (BLE).

Without limitation, the end device 170 may be any BLUETOOTH® enabled communications device such as a smart phone or other cellular phone, laptop or palmtop computer, tablet computer, a PDA, a BLUETOOTH® enabled remote controller, token, a key fob, a watch, a gaming pad, an entertainment device or any other BLUETOOTH® enabled device. Further, it is noted that the end device 170 can actually be multiple different devices in some implementations (e.g., a key fob and a BLUETOOTH® enabled communication device such as a smart phone). As such, if a driver has a BLUETOOTH® enabled smart phone and a BLUETOOTH® enabled key fob with them, the system can process signal strength information from each of those devices independently to determine the proximity of the driver to the vehicle. This is also useful in situations where one of the devices is not available (e.g., is lost, out of power, does not work) since it provides a back up. For example, in one situation, the BLUETOOTH® enabled smart phone could be dead, but the driver may have their key fob with them, or vice-versa. In another situation, the driver may have accidentally locked their key fob in the car and only has a smart phone with them.

The vehicle 110 includes tires 115, and a plurality of in-vehicle modules 140 that perform various management and control functions. Each of the tires 115 have a combined function sensor device 120 (also referred to herein simply as a "sensor") mounted therein.

Combined Function Sensor Devices (or "Sensors")

Each sensor 120 is coupled to a BLUETOOTH® antenna 122 (that can be external to the tire). Further, as illustrated in FIG. 1B, each sensor 120 includes a tire pressure monitoring system sensor 124, a BLUETOOTH® chipset 125, and an end device proximity detection/determination module 130 that includes a signal processing module 132.

The tire pressure monitoring system sensor 124 senses tire pressure in the tire 115 that it is installed in. The tire pressure monitoring system sensor 124 can be any known sensor that can be used to monitor tire pressure. The details of such sensors are known in the art and will not be described in detail herein.

In general, the BLUETOOTH® chipset 125 includes a BLUETOOTH® controller and a host (not illustrated in FIG. 1) as defined in the any of the BLUETOOTH® communication standards that are incorporated by reference herein. Some details regarding the BLUETOOTH® chipset 125 will be described in detail below with respect to FIG. 2.

The BLUETOOTH® chipset 125 generates signals to be transmitted via the BLUETOOTH® antenna 122, and also receives signals transmitted from other BLUETOOTH®-enabled device via the BLUETOOTH® antenna 122. In one embodiment, the BLUETOOTH® antenna 122 is implemented using the valve stem of each tire.

In some implementations, the signal processing module 132 of the end device proximity detection/determination module 130 processes information from signals received by the BLUETOOTH® antenna 122 to determine signal strength information, and in some implementations, to determine the approximate distance between the source of those signals (e.g., the end device 170) and the tire 115 of the vehicle 110 in which the sensor 120 is located (e.g., signal strength information observed and determined at multiple sensors can be processed using known triangulation technologies to determine the approximate distance of an end device from and one or more of the tires).

In-Vehicle Modules

Referring again to the particular embodiment that is illustrated in FIG. 1A, the in-vehicle modules 140 include: a central module 144 and an electronic control unit (ECU) 162.

The central module 144 includes a BLUETOOTH® chipset 145, an end device authentication and authorization module 147, and an end device approach detection module 150. In accordance with some of the disclosed embodiments, the central module 144 can be implemented within an infotainment module or telematics module. One advantage of implementing the central module 144 within the infotainment module or the telematics module is that either one of these modules typically already have a BLUETOOTH® chipset and therefore there is no need to provide an additional dedicated BLUETOOTH® chipset for use by the central module 144. In one embodiment, the central module 144 dynamically and randomly generates a new address for the end device 170 and the sensors 120 at the end of each driving cycle. The new address for the end device 170 can be provided to the sensors 120 so that it can be used by the sensors 120 and/or the central module 144 to identify and authenticate the end device 170. The same applies to the new addresses for each sensor 120.

The ECU 162 can include other in-vehicle modules including, but not limited to, a tire pressure management module 146, and a passive entry passive start (PEPS) system control module 148. The PEPS system control module 148 includes a remote actuation module 152 and a body control module 154. The in-vehicle modules 140 are illustrated as being grouped in a single box that delineates the in-vehicle modules 140; however, it is noted that the in-vehicle modules 140 can be distributed within the vehicle 110 and can communicate with each other over one or more buses.

The end device 170, sensors 120, central module 144 and ECU 162 are used to provide a passive entry passive start (PEPS) system for performing at least one passive entry passive start (PEPS) function with respect to a vehicle as the end device 170 (e.g., smart phone or key fob, etc.) approaches the vehicle and meets authorization criteria.

To do so, the central module 144 can be communicatively coupled to the end device 170 and to the sensors 120 via wireless connections (e.g., BLUETOOTH® low energy (BLE) wireless connections). The end device 170 communicates with the sensors 120 and the central module 144 in accordance with a BLUETOOTH® communication protocol. In addition, the end device 170 has various applications on it such as a passive entry passive start (PEPS) application program (illustrated in FIG. 2 by reference number 201) that allows it to provide information and generate commands as part of a PEPS system in conjunction with the passive entry passive start system control module 148 that is located within the vehicle.

In some embodiments, the central module 144 can perform a filtered scan for advertisement messages transmitted from the end device 170 over an advertising channel. When the end device 170 is detected during scanning, the central module 144 can transmit a discovery message to each of the sensors 120 that indicates that the sensors 120 are to being scanning for one or more advertisement messages transmitted from the end device 170 over an advertising channel. In turn, each sensor 120 can scan for the advertisement messages, and upon detection, can determine signal strength information for the advertisement message(s), and then transmit a reporting message to the central module 144 that comprises the signal strength information and an address for the end device 170. In other embodiments, the sensors 120 can also transmit advertisement messages over an advertising channel, and the end device 170 performs a filtered scan for advertisement messages transmitted from each of the sensors 120, and, upon receipt, can determine signal strength information from the advertisement messages. The end device 170 can then transmit a reporting message to the central module 144 that comprises the signal strength information corresponding to each sensor 120.

The central module 144 can determine the distance of the end device 170 from the vehicle based on the signal strength information from reporting messages received from the sensors 120 or the end device 170.

Based on the distance of the end device 170 from the vehicle the central module 144 can then determine whether the end device is within range for authorization. Thus, signal strength information can be used to determine proximity to the vehicle. In some embodiments, when the end device is determined to be within range for authorization, the central module 144 can initiate an authorization process with the end device 170 by exchanging messages over a data channel with the end device, and then control performance of at least one passive entry passive start (PEPS) function at the vehicle 100. For instance, in one embodiment, the central module 144 can perform a challenge/response and send results to BCM. Here, it will be determined if the end device 170 is authorized for vehicle entry.

For example, in some embodiments, when it's determined that the end device 170 is close enough to the vehicle 110, the PEPS functions are performed (e.g., the doors are unlocked, engine is started, etc.). When it's determined that the end device 170 is too far from the vehicle 110 the PEPS system remains inactivated and the doors remain locked.

One advantage of using the advertising channels to communicate signal strength information is that their connectionless state reduces the amount of time needed to acquire signal strength information. Using advertising channels is much faster since a connection does not have to be established between the end device 170 and the sensors 120 or the central module 144 to provide the signal strength information to the central module 144. In a BLE enabled system, the connectionless option allows for the PEPS system to collect signal strength information prior to a connection being established between the end device 170 and the sensors 120 or the central module 144. This would not be possible with other wireless technologies (including classic BLUETOOTH® technology) since they require establishment of a connection between the end device 170 and other components (the sensors 120 or the central module 144) of the system 100 prior to being able to process data provided from the end device 170. As an alternative to BLE, other wireless protocols that allow for a connectionless transfer of data could be utilized in place of BLE technology.

Proximity Detection and Control of the PEPS System

Signals received from the end device 170 can be processed by a signal processing module 132 that is implemented within the sensor 120. In one embodiment, the signal processing module 132 can determine/measure signal strength information (e.g., a received signal strength indicator (RSSI)) associated with signals communicated from the end device 170. In one implementation, the signal processing module 132 can generate a reporting message that includes the signal strength information, and can communicate the reporting message to the central module 144. The approach detection module 150 of the central module 144 can compare the signal strength information to one or more thresholds to determine whether or not the end device 170 is within range of the vehicle. When the approach detection module 150 of the central module 144 determines that the end device 170 is within a certain distance from the vehicle required for authorization, the approach detection module 150 can authorize one or more PEPS functions or commands, and communicate with the PEPS system control module 148 to execute those PEPS functions/commands. For example, in some embodiments, the PEPS system control module 148 can communicate control signals to the remote actuation control module 152 and/or the body control module 154, which can then perform various functions such as unlocking the doors of the vehicle (e.g., in response to a mechanical trigger such as pulling the door handle, trunk release, etc.), automatically starting the vehicle, etc. RSSI is just one exemplary metric that the central module 144 can use to determine distance from the vehicle 110. Alternatively, any other link quality indicators, such as a BLUETOOTH® proximity profile, can be used to determine the distance between two BLE enabled devices. The proximity profile is defined in the BLUETOOTH® low energy standard. The proximity profile uses a number of metrics including signal strength information, state of the battery charge, whether a device is connected, etc. to characterize the proximity of one BLE enabled device (e.g., the end device 170) to another BLE enabled device (e.g., the sensors 120 or the central module 144).

In addition, in accordance with some of the disclosed embodiments, the central module 144 also includes an authentication and authorization module 147 that can perform authentication and/or authorization mechanisms that are described in any of the BLUETOOTH® communication standards that are referenced herein, as well as other authentication and/or authorization mechanisms that are not described in the BLUETOOTH® standards. As such, the authorization and authentication module 147 can receive signals transmitted from the end device 170 and perform authorization and/or authentication of the end device 170. When the end device 170 has been authorized and/or authenticated this allows the end device 170 to act as a controller for the some of the in-vehicle modules 140. Depending on the implementation this control can be performed automatically or at the command of a user who possesses the end device 170.

Tire Pressure Management

The central module 144 is communicatively coupled to the tire pressure management module 146. As illustrated in FIG. 1B, the tire pressure management sensor 124 can be disposed for example within the tire of the vehicle and monitor tire pressure. Information regarding the tire pressure is then communicated to the BLUETOOTH® chipset 125, which in turn communicates the tire pressure data over another wireless communication link to the combined function module 144 which in turn provides a tire pressure data to the tire pressure management module 146

As noted above, the sensors 120, the central module 144 and the end device 170 can each include BLUETOOTH® chipsets 125/145/175. Some features of one implementation of the BLUETOOTH® chipsets will now be described below with reference to FIG. 2.

Figure 2:
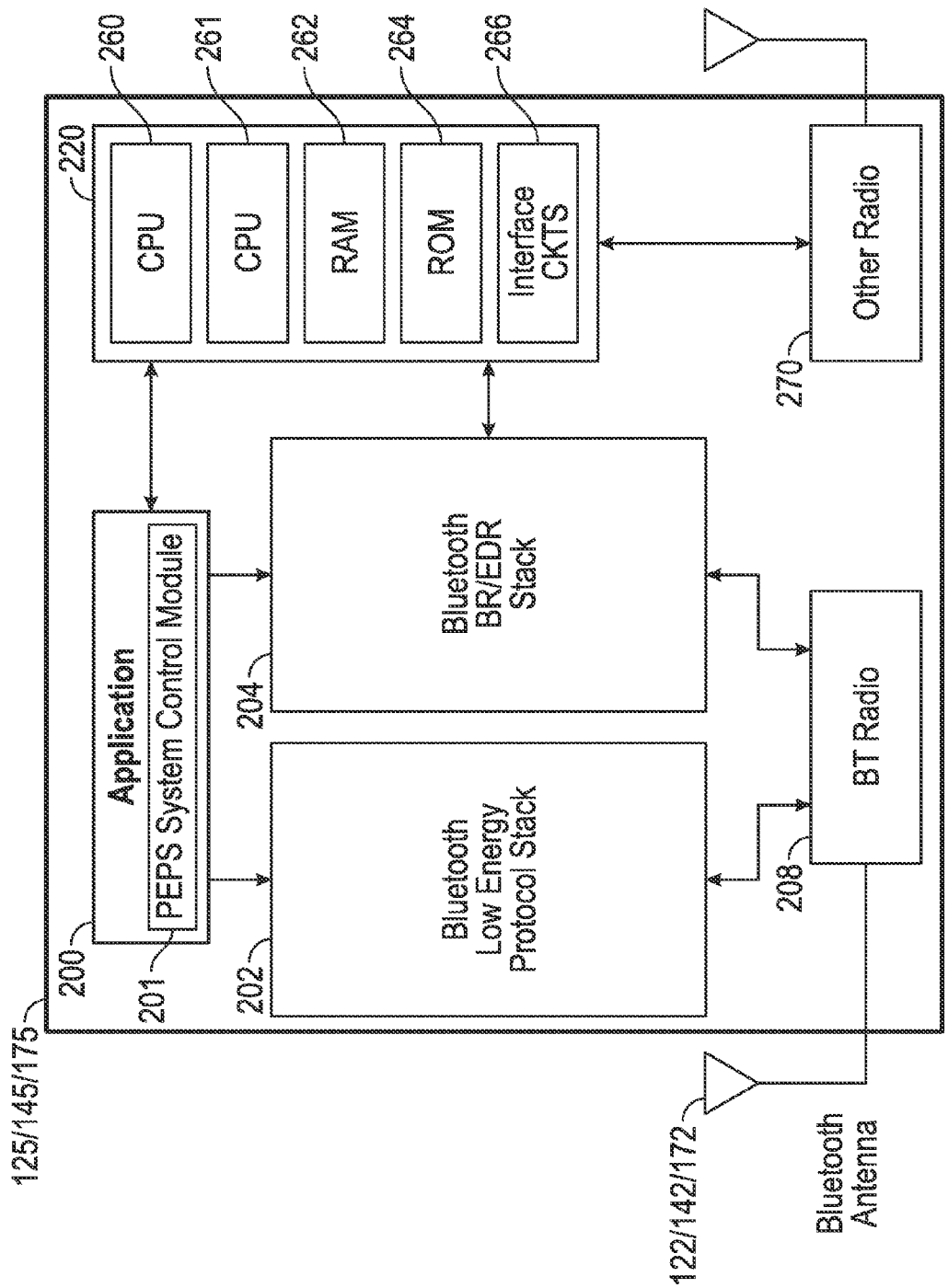
FIG. 2 is a simplified block diagram that illustrates an example of a BLUETOOTH® chipset and a BLUETOOTH® antenna that can be implemented at the combined function sensor device, the central module, and/or the end device in accordance with some of the disclosed embodiments.

FIG. 2 is a block diagram that illustrates an example of a BLUETOOTH® chipset 125/145/175 and a BLUETOOTH® antenna 122/142/172 that can be implemented at the sensor 120, the central module 144, and/or the end device 170 in accordance with some of non-limiting examples of the disclosed embodiments.

The chipset 125/145/175 includes application programs 200, a BLUETOOTH® Low Energy (BLE) protocol stack 202, an optional BLUETOOTH® Basic Rate (BR)/Enhanced Data Rate (EDR) protocol stack 204, a BLUETOOTH® radio transceiver 208, a processor 220 that includes, for example, a central processing unit (CPU), such as a dual core central processing unit (CPU) 260 and 261 (or any other multicore CPU having any number of processor cores), a random access memory (RAM) 262, a read only memory (ROM) 264, and interface circuits 266 to interface with BLUETOOTH® radio transceiver 208. The RAM 262 and ROM 264 may be implemented using any known type of semiconductor memory.

Any of the chipsets 125/145/175 described herein can be either a single mode device or a dual mode device depending on the implementation.

A single mode chipset is a BLE-only chipset that is optimized for ultra-low power operation, and that can communicate with other single mode chipsets and dual-mode chipsets when the latter are using the BLE technology part of their architecture to transmit and receive. Single-mode chips can operate for long periods (months or even years) using a coin cell battery (e.g., a 3V, 220 mAh CR2032).

By contrast, Dual-Mode chipsets are also capable of communicating with Classic BLUETOOTH® technology and other dual-mode chipsets using a conventional BLUETOOTH® architecture. Dual-Mode chipsets are capable of communicating with all the legacy Classic BLUETOOTH® devices as well as BLE devices. However, because they are required to perform Classic BLUETOOTH® and BLE duties, dual-mode chips are not optimized for ULP operation to the same degree as single-mode devices. Rather, Classic BLUETOOTH® technology and BLE dual mode devices typically require the capacity of at least two AAA cells (which have 10 to 12 times the capacity of a coin cell and much higher peak current tolerance), and often more, to power them for days or weeks (depending on the application).

As such, the chipset 125/145/175 includes at least a BLUETOOTH® Low Energy (BLE) protocol stack 202, and in some implementations, may also include a BLUETOOTH® BR/EDR protocol stack 204.

The BLE protocol stack 202 is described in the BLUETOOTH® Core Specification, Version 4.0 protocol specification, which is incorporated by reference herein in its entirety. The BLE protocol stack 202 is optimized for occasional connections that allow for longer sleep times between connections, small data transfers, very low duty cycles and simpler topology than Classic BLUETOOTH® devices. Some characteristics of BLE technology that underlie help achieve ultra-low power (ULP) performance are maximized standby time, fast connection, and low peak transmit/receive power. Classic BLUETOOTH® employs a "connection oriented" radio with a fixed connection interval. In contrast, BLE technology employs a variable connection interval that can be set from a few milliseconds to several seconds depending on the application. In addition, because it features a very rapid connection, BLE technology can normally be in a connectionless state where the two ends of a link are aware of each other, but link up only when absolutely necessary and then for as short a time as possible. This connectionless operational mode of BLE technology ideally suits transmission of data where fully asynchronous communication can be used to communicate send low volumes of data infrequently.

In some implementations, any or all of the chipsets 125/145/175 may also include a BLUETOOTH® BR/EDR protocol stack 204, which is described in the BLUETOOTH® Specification version 3.0+HS, which is incorporated by reference herein in its entirety.

The BLUETOOTH® protocol stacks 202 and 204 and/or application programs 200 may be embodied as program logic stored in the RAM 262 and/or ROM 264 in the form of sequences of programmed instructions which, when executed in the CPUs 260 and/or 261, carry out at least some of the functions of the disclosed embodiments. The program logic may be delivered to the RAM 262 or ROM 264 from a computer program product in the form of computer-usable media such as resident memory devices, smart cards or other removable memory devices. Alternately, they may be embodied as integrated circuit logic in the form of programmed logic arrays or custom designed application specific integrated circuits (ASICs). In some implementations, the program logic may be downloaded from such computer readable media to be stored, for example, in the RAM 262 or programmable ROM 264 for execution by the CPUs 260 and/or 261.

The BLUETOOTH® radio 208 may include separate transceiver circuits, or alternately, the radio 208 may be a single radio module capable of handling one or multiple channels in a high speed, time and frequency multiplexed manner.

The other radio 270 may be any of a variety of wireless personal area, wireless local area, or wireless wide area radio devices that are known in the art.

Finally, with respect to the end device 170, the application programs 200 can include, among other things, a PEPS system control module 201 that once authorized to control the vehicle 110 can be used to actively or inactively control any PEPS functions described herein.

Bluetooth Low Energy (BLE) Protocol Stack

In the description that follows details will be provided regarding some of the layers of the BLE protocol stack. Further details regarding each layer are described in the BLUETOOTH® Specification Version 4.0 (as well as its supplements and Addenddums).

As is known in the art, the BLE protocol stack 202 includes two main parts that are commonly referred to as the controller and the host. The controller comprises a physical layer and a link layer (LL), and are typically implemented as a small System-on-Chip (SOC) with an integrated radio, such as radio 208. The host runs on an application processor and includes upper layer functionality including the Logical Link Control and Adaptation Protocol (L2CAP), the Attribute Protocol (ATT), the Generic Attribute Profile (GATT), the Security Manager Protocol (SMP) and the Generic Access Profile (GAP).

The L2CAP provides data services to upper layer protocols like the SMP and ATT. It is responsible for protocol multiplexing and data segmentation into smaller packets for the LL controller, and de-multiplexing and reassembly operation on the other end. The L2CAP is a backend interface for the GAP that defines the generic procedures related to the discovery of BLE devices and link management aspects of connecting to other BLE devices.

The ATT is optimized for small packet sizes used in BLE. The ATT allows an attribute server to expose a set of attributes and their associated values to an attribute client. These attributes can be discovered, read, and written by peer devices.

The GATT describes a service framework using the ATT for discovering services, and for reading and writing characteristic values on a peer device. It interfaces with the application through the application's profiles. The application profile itself defines the collection of attributes and any permission needed for these attributes to be used in the communication.

The GAP provides an interface for the application to configure and enables different modes of operation (e.g. advertising or scanning, and also to initiate, establish, and manage connection with other devices). The GAP will be described in greater detail below.

The SMP is responsible for device pairing and key distribution. The SMP defines how the device's security manager (SM) communicates with its counterpart on the other device. The SM provides additional cryptographic functions that may be used by other components of the stack. BLE utilizes the standard AES-128 bit crypto engine and uses a pairing mechanism for key distribution. The SMP provides a mechanism to not only encrypt the data but also to provide data authentication.

Communication between the host and the controller is standardized as the Host Controller Interface (HCI). Non-core profiles (i.e., application layer functionality not defined by the BLUETOOTH® specification) can be implemented on top of the host.

BLUETOOTH® Low Energy (BLE) Physical Layer and BLUETOOTH® Low Energy (BLE) Channels BLE operates in the 2.4 GHz Industrial Scientific Medical (ISM) band and defines 40 Radio Frequency (RF) channels with 2 MHz channel spacing. There are two types of BLE RF channels: advertising channels and data channels. Three advertising channels are used for device discovery, connection establishment and broadcast transmission, whereas thirty-seven (37) data channels are used for bi-directional communication between connected devices.

In BLE, when a device only needs to broadcast data, it transmits the data in advertising packets over advertising channels. Any device that transmits advertising packets can be referred to as an advertiser. The transmission of packets through the advertising channels takes place in intervals of time called advertising events. Within an advertising event, the advertiser sequentially uses each advertising channel for packet transmission. For sake of convenience, the advertising channels will sometimes be referred to herein as an advertising channel.

Devices that only receive data through the advertising channels can be referred to as scanners.

Bidirectional data communication between two devices requires them to connect to each other. The creation of a connection between two devices is an asymmetric procedure by which an advertiser announces through the advertising channels that it is a connectable device, while the other device, which can be referred to as an initiator, scans for such advertisements. When an initiator finds an advertiser, it may transmit a connection request message to the advertiser, which creates a point-to-point connection between the two devices. Both devices can then communicate by using the physical data channels. The packets for this connection will be identified by a randomly generated 32-bit access code.

Physical channels can employ a Gaussian Frequency Shift Keying (GFSK) modulation, which is simple to implement. The modulation index can be in the range between 0.45 and 0.55, which allows reduced peak power consumption. An adaptive frequency hopping mechanism is used with respect to the data channels in order to mitigate interference and wireless propagation issues, such as fading and multipath. This adaptive frequency hopping mechanism selects one of the 37 available data channels for communication during a given time interval.

In accordance with the disclosed embodiments, any over-the-air communications between the chipsets 125/145/175 of the sensors 120, the central module 144, and the end device 170, take place over either a BLE advertising channel or a BLE data channel that is compliant with the BLE standards. In other words, the BLE advertising channels are connectionless and do not require a connection be established between the transmitter and the receiver in order for them to communicate over the BLE advertising channels. By contrast, the BLE data channels are connection-oriented such that a connection must be established between the transmitter and the receiver before communications take place over the BLE data channels. These BLE channels will be described in further detail below with reference to FIG. 6.

BLUETOOTH® Low Energy (BLE) Link Layer

The BLE link layer (LL) controller is responsible for low level communication over a physical layer interface. The BLE LL controller manages the sequence and timing of transmitted and received frames, and using the link layer protocol, communicates with other nodes regarding connection parameters and data flow control. The BLE LL controller also handles frames received and transmitted while the device is in advertising or scanner modes. The BLE LL controller also provides gate keeping functionality to limit exposure and data exchange with other devices. If filtering is configured, the BLE LL controller maintains a "white list" of allowed devices and will ignore all requests for data exchange or advertising information from others. It not only helps with a security aspect but also reduces power consumption. The BLE LL controller uses the HCI to communicate with upper layers of the stack if they are not collocated.

BLE defines two device roles at the LL for a created connection: the master and the slave. These are the devices that act as initiator and advertiser during the connection creation, respectively. A master can manage multiple simultaneous connections with different slaves, whereas each slave can only be connected to one master. Thus, the network composed by a master and its slaves, which is called a piconet, follows a star topology Device Discovery and Connection Setup BLE uses a push model instead of the pull model used in traditional BLUETOOTH® wireless technology. Devices that wish to be discovered by other devices use broadcast advertising (or beacons) in an area to devices listening for such broadcasts, whereas traditional BLUETOOTH® wireless technology places devices wishing to be discovered by other devices in a listening mode for broadcasts from inquiring devices before sending device information. In BLE, advertising broadcasts are also used as a method for a device to indicate to surrounding devices that it is connectable with other devices or a specific device. Devices listening for advertising broadcasts may also be in an exclusive connectable mode where they respond only when receiving connectable advertising broadcasts from devices wishing to connect to another device.

GAP Roles

At the highest level of the core BLE stack 202, the GAP specifies device roles, modes and procedures for the discovery of devices and services, the management of connection establishment, and security.

For devices operating over a BLE physical channel, the BLE GAP defines four roles with specific requirements on the underlying controller: broadcaster, observer, peripheral and central. Each role specifies the requirements for the underlying controller. This allows for controllers to be optimized for specific use cases.

Although these roles are defined in the BLE standards, they will be briefly described prior to describing some specific examples of different roles the sensors 120, the central module 144, and the end device 170 can take in various methods in accordance with some of the disclosed embodiments. The various roles will be described below with reference to generic "device(s)"; however, those skilled in the art will appreciate that a device refers to any entity that includes a BLUETOOTH® chipset and BLUETOOTH® antenna including the sensors 120, the central module 144, and the end device 170 that are described herein.

Broadcaster Role

A device in the broadcaster role can also be referred to as a broadcaster. A device operating in the broadcaster role must have a transmitter, and may have a receiver. A device in the broadcaster role does not support connections with other devices. A broadcaster only broadcasts data via the advertising channels. More specifically, a device operating in the broadcaster role is a device that sends advertising events as described in [Vol. 6], Part B Section 4.4.2 of the BLUETOOTH® Core Specification Version 4.0. As such, the broadcaster role is optimized for transmitter only applications.

Observer Role

A device operating in the observer role can also be referred to as an observer device or as an observer. An observer must have a receiver, and may have a transmitter. The observer role does not support connections with other devices. The observer role is optimized for receiver only applications, and is complementary to the broadcaster role. In other words, a device operating in the observer role is a complementary device for a broadcaster (e.g., it has the purpose of receiving the broadcast data transmitted in advertisements from the broadcaster). More specifically, a device operating in the observer role is a device that receives advertising events as described in [Vol. 6], Part B Section 4.4.3 of the BLUETOOTH® Core Specification Version 4.0.

Peripheral Role

A device operating in the peripheral role can also be referred to as a peripheral or a peripheral device. A peripheral device must have both a transmitter and a receiver. Devices supporting the peripheral role only require controllers that support the controller's slave role. The peripheral role is optimized for devices that support a single connection and are less complex than central devices. A peripheral device pairs with the central device and acts as the client in a connection. Any device that accepts the establishment of a BLE physical link using any of the connection establishment procedures as defined in Section 13.3 of the BLUETOOTH® Core Specification Version 4.0 is referred to as being in the peripheral role. The peripheral role is the slave in a connection and may only maintain one connection. In other words, a device operating in the peripheral role will be in the slave role in the Link Layer Connection State as described in [Vol. 6], Part B Section 4.5 of the BLUETOOTH® Core Specification Version 4.0.

It is noted that when sending data to the central device, the peripheral device acts as a data server to the connecting central device, which in turn acts as a client.

Central Role

A device operating in the central role can also be referred to as a central device or as a central. A central must have both a transmitter and a receiver. A device that supports the central role initiates the establishment of a physical connection. The central role supports multiple connections, and is the initiator for all connections with devices in the peripheral role. The central role is designed for a device that is in charge of initiating and managing multiple connections, whereas the peripheral role is designed for simple devices which use a single connection with a device in the central role. The central role is the master in a connection and may maintain multiple connections. A central device pairs with peripheral devices and acts as the host of a connection. As such, the central and peripheral roles require that the device's controller support the master and slave roles, respectively. Devices supporting the central role require a controller that supports the controller's master role and generally supports more complex functions compared to the other BLE GAP roles. A device operating in the central role will be in the master role in the Link Layer Connection State as described in [Vol. 6], Part B Section 4.5 of the BLUETOOTH® Core Specification Version 4.0.

It is noted that when receiving data from a peripheral device, the central device acts as a client to the peripheral and the peripheral device acts as a data server.

Concurrent Operation in Multiple GAP Roles

If supported by its underlying controller, a device may support various BLE GAP roles concurrently, but only one role can be adopted at a given time. The host should read the supported LL states and state combinations from the controller before any procedures or modes are used.

Figure 3A:
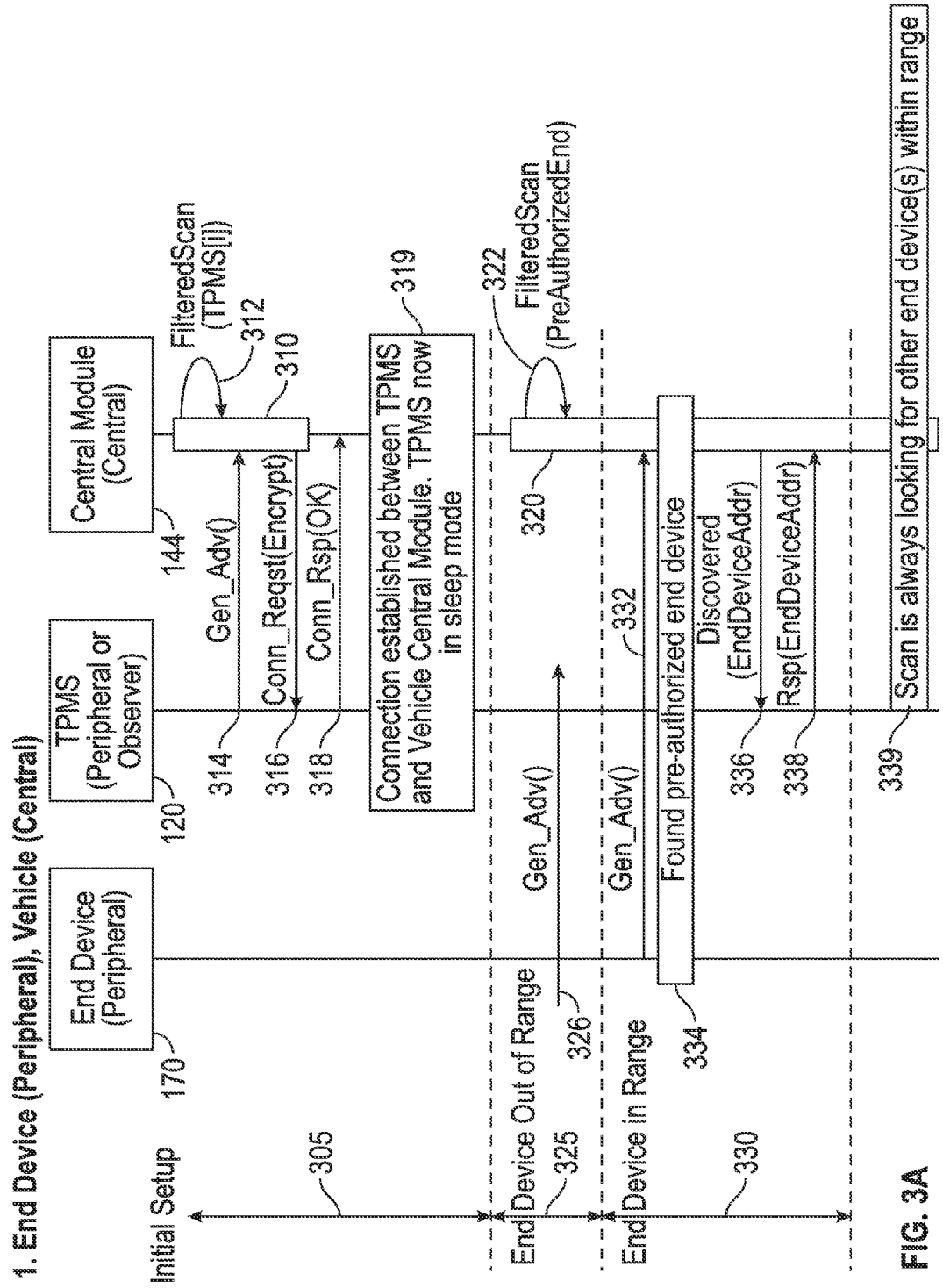
Figure 3B:
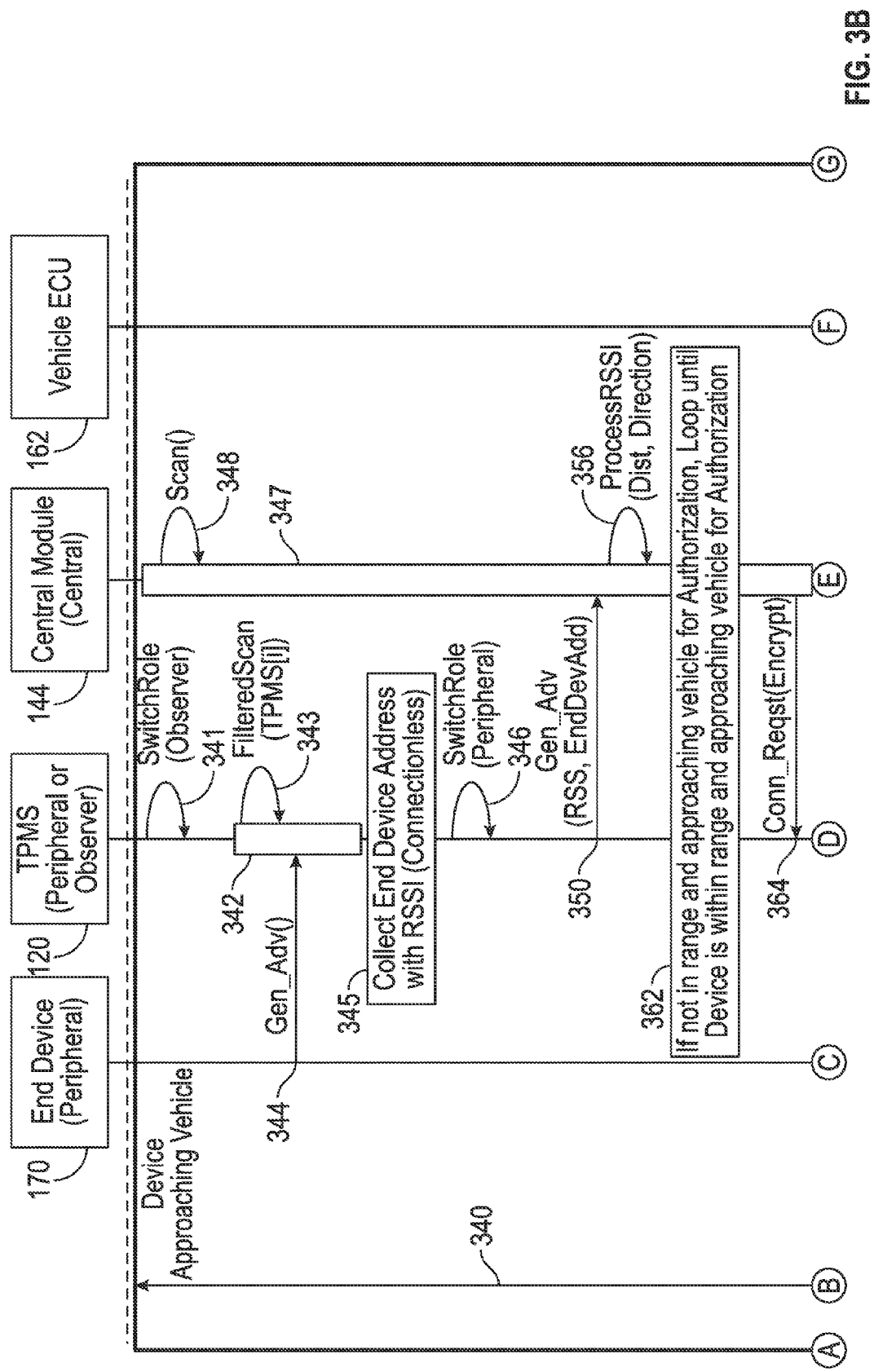

FIGS. 3A through 3C illustrate a method in accordance with some of the disclosed embodiments. In FIGS. 3A through 3C, the end device 170 has a peripheral role, the sensors 120 have either peripheral or observer role at different points, and the central module 144 has a central role.

As illustrated in FIG. 3A, method of FIGS. 3A through 3C begins with an initial connection setup phase 305 in which connections are established or setup between the sensors 120 and the central module 144.

At 310, the central module 144 performs a filtered scan to detect advertisement messages transmitted by the sensors 120 on one of the advertising channels. At block 310, the loop 312 indicates that the central module 144 is continuously performing the filtered scan for advertisement messages transmitted from the sensors 120. As part of the filtered scan at 310, the central module 144 continuously scans for sensors 120 so that it can establish a connection with any of the sensors 120 that are detected during scanning. Each of the advertising messages include an identifier for the sensor that transmitted it.

At some point during the initial setup phase 305, one or more of the sensors 120 transmit advertisement messages on one of the advertising channels as indicated at 314. Although FIG. 3A illustrates communication of a single advertisement message, it will be appreciated that each of the sensors 120 can transmit their own separate advertising message(s).

When the central module 144 receives an advertisement message from one or more of the sensors 120, at 316, the central module 144 transmits a connection request message to that particular sensor in order to establish a connection with the sensor. In one embodiment, the connection request message can be encrypted using any known encryption technology to provide improved security. Although FIG. 3A illustrates communication of a single connection request message, it will be appreciated that the central module 144 transmits a separate connection request message to each of the sensors 120 that were detected during scanning. Upon receiving the connection request message at each particular sensor, that sensor will process the connection request message to determine that it is from the central module 144 and respond with a confirmation of the connection and use standard connection protocol to establish a secure connection between each sensor 120 and the central module 144.

At 318, each of the sensors 120 that received a connection request message from the central module 144 can communicate a connection response message at 318. Each connection response message is an acknowledgment from a particular sensor 120 to indicate that a connection has been established between that particular sensor 120 and the central module 144. Once the connection is established, the sensors 120 enter listening mode at 319. When in listening mode, the sensors 120 are in a connected state with the central module 144, not transmitting data, and awaiting further commands from the central module 144 before transitioning to active communication mode. Although FIG. 3A illustrates communication of a single connection response message, it will be appreciated that each of the sensors 120 (that received a connection request message from the central module 144) transmits a separate connection response message to the central module 144.

At 320, the central module 144 performs a filtered scan for pre-authorized end devices (e.g., continuously scans for incoming advertisement messages transmitted from one or more end devices 170 having identifiers associated therewith that were previously authorized (e.g., a device that has been previously paired with the vehicle in a secure manner) to perform PEPS functions with respect to the vehicle). At block 320, the loop 322 indicates that the central module 144 is continuously performing the filtered scan for advertisement messages transmitted from pre-authorized end devices such as end device 170.

When the end device is out of range at phase 325, advertisement messages transmitted (at 326) by the end device 170 (at 326) are not received at the central module 144. However, when the end device 170 comes within range of the central module (at 330 of FIG. 3A), the advertisement messages transmitted (at 332) by the end device 170 will be received by the central module 144 is scanning for advertisement messages at 320.

When the central module 144 receives an advertisement message from the end device 170 over one of the advertising channels, the central module 144 has found a preauthorized end device as indicated by block 334 of FIG. 3A. At 336, the central module 144 communicates a discovery message to each of the sensors 120. The discovery message is communicated at 336 includes an address for the end device 170 that was discovered during the filtered scan at 320. The discovery message at 336 serves to wake up the sensors 120 so that the sensors 120 can scan for communications from the end device 170. When the sensors receive the discovery message, the sensors 120 can respond by transmitting a response message at 338 which serves as an acknowledgment to the central module 144 that the sensors will begin looking for the end device 170 that has the address that was indicated in the discovery message at 336. As indicated at 339, the central module 144 continues to perform the filtered scan for other pre-authorized end devices (not illustrated) after the end device 170 has been discovered (i.e., detected during scanning at 320).

Referring now to FIG. 3B, at 340, a search process begins for end devices that might be approaching the vehicle. At 341, the sensors 120 switch to an observer role and then begin performing a filtered scan at 342 for advertisement messages transmitted from the end device 170 (that might be approaching the vehicle). At 342 the sensors 120 continuously perform a filtered scan for advertisement messages communicated by the end device 170. The continuous nature of the scanning performed at 342 is indicated by the loop 343 of FIG. 3B. As the sensors 120 receive one or more general advertisement messages transmitted from the end device 170 at 344, the sensors 120 will determine signal strength information for each advertisement message, and an address of the end device 170 that transmitted the advertisement messages as indicated at 345. After this happens, at 346, the sensors switch roles again and begin operating in a peripheral role.

At 347, the central module 144 scans for general advertisement messages transmitted from the sensors 120. The advertisement messages communicated from the sensors 120 include the measured signal strength information (e.g., a RSSI) and an address of the end device 170. At block 347, the loop 348 indicates that the central module 144 is continuously performing the scan for general advertisement messages transmitted from the sensors 120. Although FIG. 3B illustrates communication of a single general advertisement message, it will be appreciated that each of the sensors 120 transmits its own separate general advertisement message to the central module 144, and that the signal strength information in each of these messages can be different since its likely that each sensor 120 will observe different received signal strength for the same end device.

Upon receiving advertisement messages that were communicated at 350, the central module 144 processes the signal strength information (e.g., a RSSI) from the advertisement message, as indicated at 356, to determine the distance of the end device 170 from the vehicle and whether it is within range for authorization, and also the direction that the end device 170 is approaching the vehicle from.

When the central module 144 determines that the end device 170 is not in range for authorization, the communications and processing performed at 341-356 repeats. As indicated at 362, the communications and processing performed at 341-356 will continue to loop and repeat until the end device 170 is determined to be within range for authorization.

When the central module 144 determines, based on the processed signal strength information, that the end device 170 is in range for authorization, the method will then proceed to 364, where the central module 144 communicates connection request messages to each of the sensors 120. In one embodiment the connection request can be encrypted communication to provide additional security. As above, although FIG. 3B illustrates communication of a single connection request message at 364, it will be appreciated that the central module 144 transmits separate connection request message to each of the sensors 120 that were detected during scanning Referring now to FIG. 3C, upon receiving one of the connection request messages, at 366, each of the sensors 120 communicates a connection response message back to the central module 144 to acknowledge that a connection has been established between that sensor 120 and the central module 144. Next, at 368, the central module 144 communicates a generic attribute profile (GATT) request message over one of the data channels to each of the sensors 120 that it has established a connection with. The GATT request message (communicated 368) includes a request for the sensor 120 to continue scanning for the end device 170 and acquire signal strength information for that end device 170.

Having determined that the end device 170 is within a range of the vehicle that is required for authorization, an authorization process begins at 370. The authorization process performed at 370 can vary depending on the implementation. In general, during the authorization process at 370, the central module 144 and the end device 170 exchange messages per an authorization process to confirm whether the end device 170 is authorized by the central module 144 to trigger passive entry passive start functions. In one non-limiting implementation, at 371, the central module 144 communicates a connection request message to the end device 170, and at 372, upon receiving the connection request message, the end device 170 communicates a connection response message back to the central module 144 to acknowledge that a connection is present between the end device 170 and the central module 144.

At 374, the end device 170 communicates a GATT request message over one of the data channels to the central module 144 to request a connection with the central module 144. The GATT request message (communicated at 374) includes an address of the end device 170. When the central module 144 receives the GATT request message (that was communicated at 374), the central module 144 can communicate a GATT response message back to the end device 170 (over one of the data channels) at 376 to confirm that the end device 170 is connected to the central module 144 of the vehicle. The message exchange at 370 is exemplary and in other embodiments can include any known authorization protocols, and can include additional messages exchanged between the central module 144 and the end device 170 that are not illustrated for sake of clarity.

Following the authorization process at 370, at 378, 379, the central module 144 can start timer to wait for a trigger event to occur within a timeout period. If the trigger event does not occur within the specified time out period (measured by the timer), then at 380, the central module 144 will cancel the authorization, and the method will loop back to the start of block 340, and authorization will be performed again. In short, requiring that that the trigger event takes place within a short time out period provides a way to prevent another person from entering the vehicle when the person possessing the end device 170 is far away from the vehicle. The trigger event can be, for example, a mechanical trigger such as pulling on the door handle or touching another portion the vehicle, releasing the trunk, activating a liftgate button, etc.

By contrast, when the trigger event occurs within the timeout period (that is measured by the timer), the electronic control unit (ECU) 162 of the vehicle (or other module implemented within the vehicle such as the body control module (BCM)) will receive a trigger, and upon receiving the trigger, at 382, the ECU 162 will again check the authorization to determine if an end device 170 is present that has been authorized to access the vehicle. In one embodiment, the ECU 162 can request the status of the end device 170 (i.e., whether the end device 170 is authorized or not) from the central module 144 to determine whether the end device 170 is an authorized end device. In another embodiment, the ECU 162 performs the pre-authorization (in advance) while the end device 170 was approaching the vehicle, and determines, based on the result of that pre-authorization, whether the end device 170 is an authorized end device.

Once the ECU 162 has confirmed that the end device 170 is authorized to access the vehicle (e.g., the central module 144 indicates that the end device 170 has authorized status or the ECU 162 determines that the end device is an authorized end device), at 384, the ECU 162 will execute processing necessary to perform one or more passive entry passive start (PEPS) functions or commands to allow for vehicle access, such as unlocking the vehicle's doors, unlocking one of the vehicle's doors, starting the engine of the vehicle, etc.

Figure 4A:
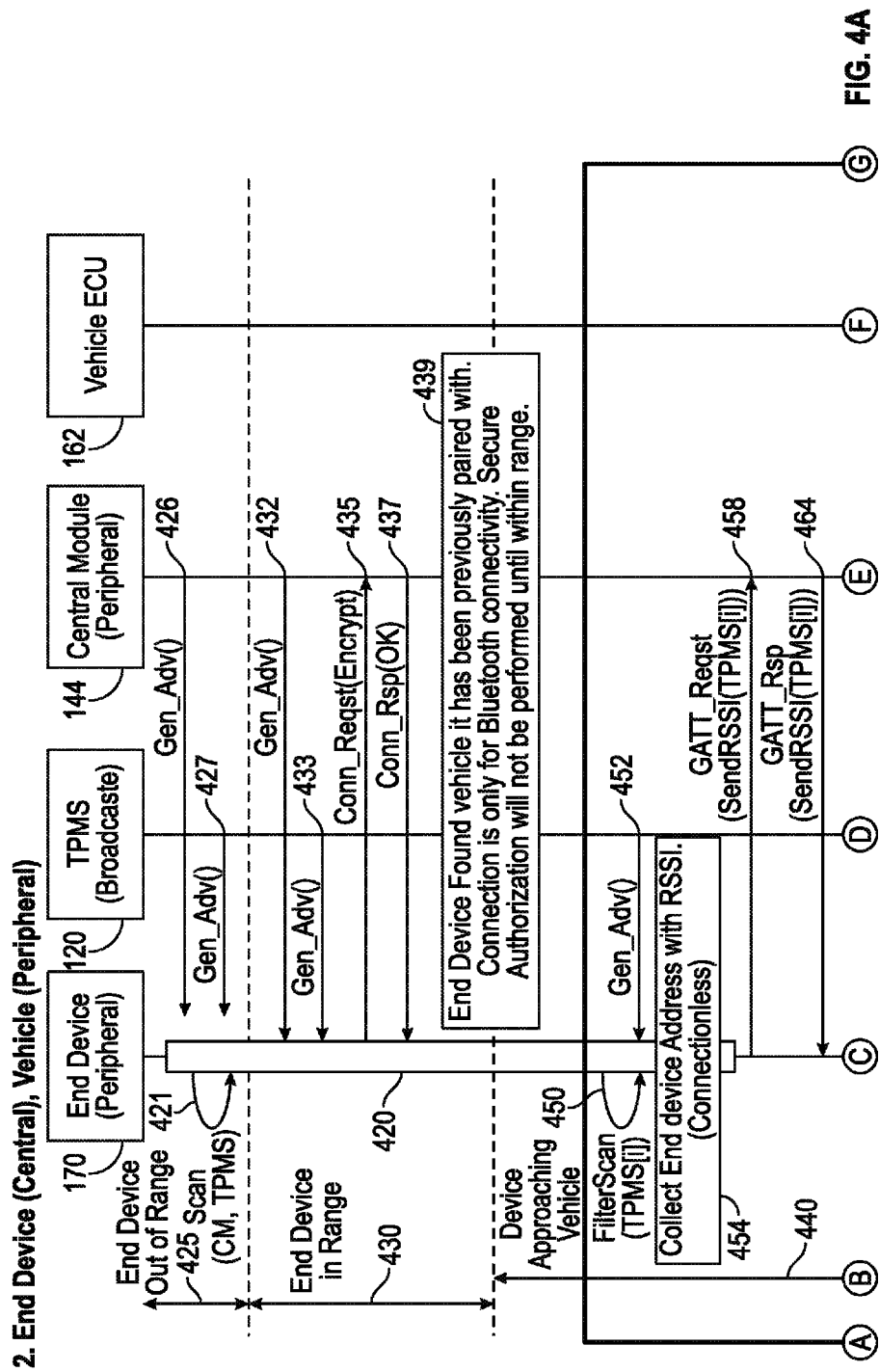
FIGS. 4A and 4B illustrate another method in accordance with some of the disclosed embodiments.
Figure 4B:
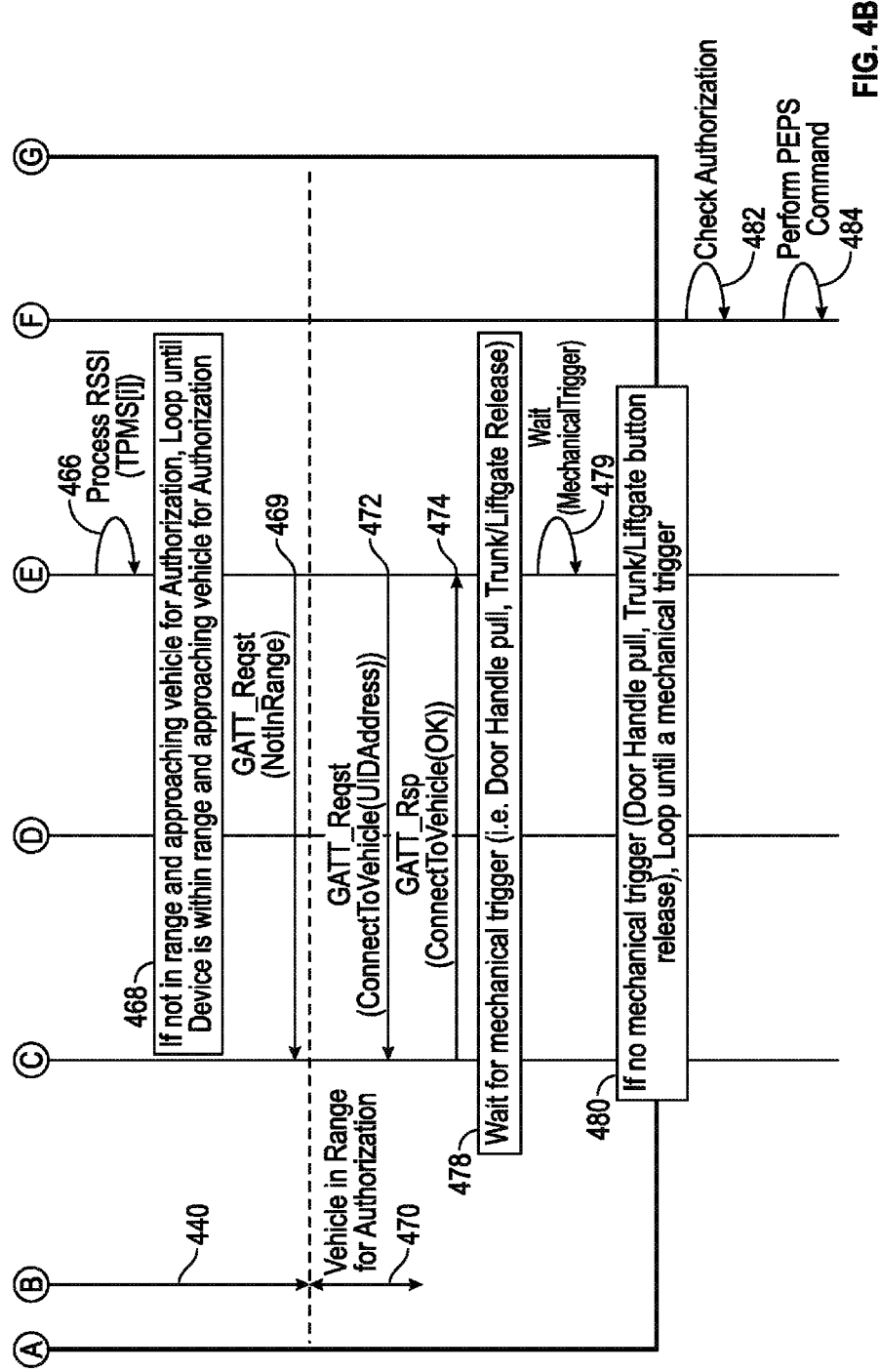

FIGS. 4A and 4B illustrate another method in accordance with some of the disclosed embodiments. In this embodiment, the central module 144 has the role of peripheral, the end device 170 has the role of central, and the sensors 120 have a broadcaster role.

The method begins at 420 with the end device 170 scanning for either the central module 144 or the sensors 120. In FIG. 4A, loop 421 is used to indicate that the filtered scanning performed by the end device 170 is continuous. In other words, the end device 170 continuously scans for advertisement messages that are transmitted by the central module 144 and the sensors 120.

During phase 425, the end device 170 is out of range of the vehicle, and therefore the end device does not receive advertisement messages communicated from the central module 144 (at 426) or advertisement messages communicated from the sensors 120 (at 427).

During phase 430, the end device 170 moves within range of the vehicle, and advertisement messages that are communicated by the central module 144 (at 432) and the sensors 120 (at 433) are received by the end device 170. In response to the advertising messages, as illustrated at 435, the end device 170 communicates a connection request message to the central module 144, and in response, at 437, the central module 144 communicates a connection response message back to the end device 172 confirm that a connection has been established between the central module 144 and the end device 170.

As indicated at 439, when the end device 170 receives a connection response message, this indicates to the end device 170 that it has a BLE connection with the central module 144. As will be described below, although the end device has a BLE connection with the central module 144, the end device 170 will not be authorized to initiate PEPS functions until the central module 144 has determined that the end device 170 is within range of the vehicle, and "authorized" to initiate PEPS functions.

After the connection between the central module 144 and the end device 170 is established, method proceeds to 440 where the authorization process begins. At 450, the end device 170 begins performing a filtered scanning for advertisement messages that are communicated from the sensors 122 to the end device 170. For any advertisement messages received from the sensors 120, at block 454, the end device 170 will determine received signal strength information and a device address for the sensor 120 that communicated that particular advertisement message.

After the end device 170 has received an advertisement message from one or more the sensors 120, at 458, the end device 170 communicates one or more GATT request messages (over one of the data channels) to the central module 144. Each GATT request message includes an address for a particular sensor (that an advertisement message was received from) and signal strength information (e.g., a RSSI) associated with the advertisement message received from that particular sensor. Although FIG. 4A illustrates communication of a single GATT request message, it will be appreciated that the end device can communicate one GATT request message for each sensor 120 that includes an identifier and signal strength information associated with the particular sensor.

Next, at 464, the central module 144 can generate and send a GATT response message to the end device 172 (over one of the data channels) to confirm that the end device 170 is connected to the central module 144 of the vehicle. The GATT response message acknowledges that the GATT request message that was communicated at 458 has been received by the central module 144.

At 466, the central module 144 processes the signal strength information for each of the GATT request messages received from the end device 170, and determines the distance of the end device 170 from each of the particular sensors 120, as well as the direction that the end device 170 is approaching the vehicle from. Based on the distance of the end device 170 from the vehicle, the central module 144 can also determine whether the end device 170 is within range for authorization (e.g., in close enough proximity to the vehicle to allow for one or more PEPS functions to be performed).

To the extent the central module 144 determines that the end device 170 is not within range for authorization, at 468, the method will loop back to 450 where the end device 170 continues to scan for advertisement messages, and the steps 454-466 repeat. In some implementations, at 469, the central module 144 can transmit a GATT request message (over one of the data channels) to the end device 170 to inform it that it is not within range for authorization and should continue scanning Referring now to FIG. 4B, when the central module 144 determines that the end device 170 is within range for authorization at 466, method proceeds to phase 470. At 472, then the central module 144 communicates a GATT request message to the end device 170 to indicate that the end device 170 is authorized to connect to the central module 144 vehicle. This GATT request message includes the address of the end device 170. At 474, the end device 170 communicates a GATT response message to the central module 144 to acknowledge that the end device 170 is connected to the central module 144 of the vehicle as an authorized device. At this point, the central module 144 can begin an authorization process, as described in greater detail above with respect to FIG. 3B.

The processing at 478, 479, 480, 482 and 484 is identical to that described above with respect to 378, 379, 380, 382 and 384, and for sake of brevity a description of the steps will not be repeated.

Figure 5A:
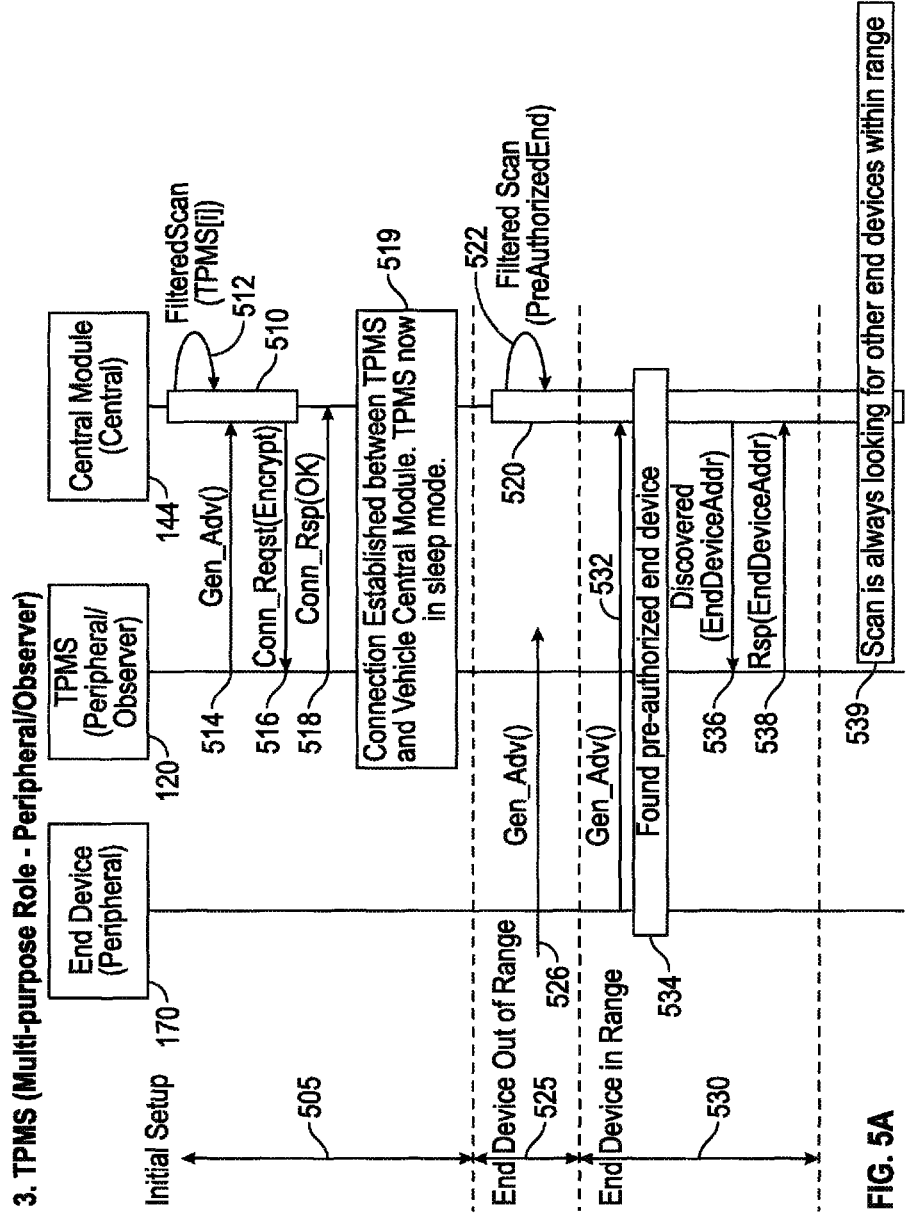
FIGS. 5A through 5C illustrate yet another method in accordance with some of the disclosed embodiments.
Figure 5B:
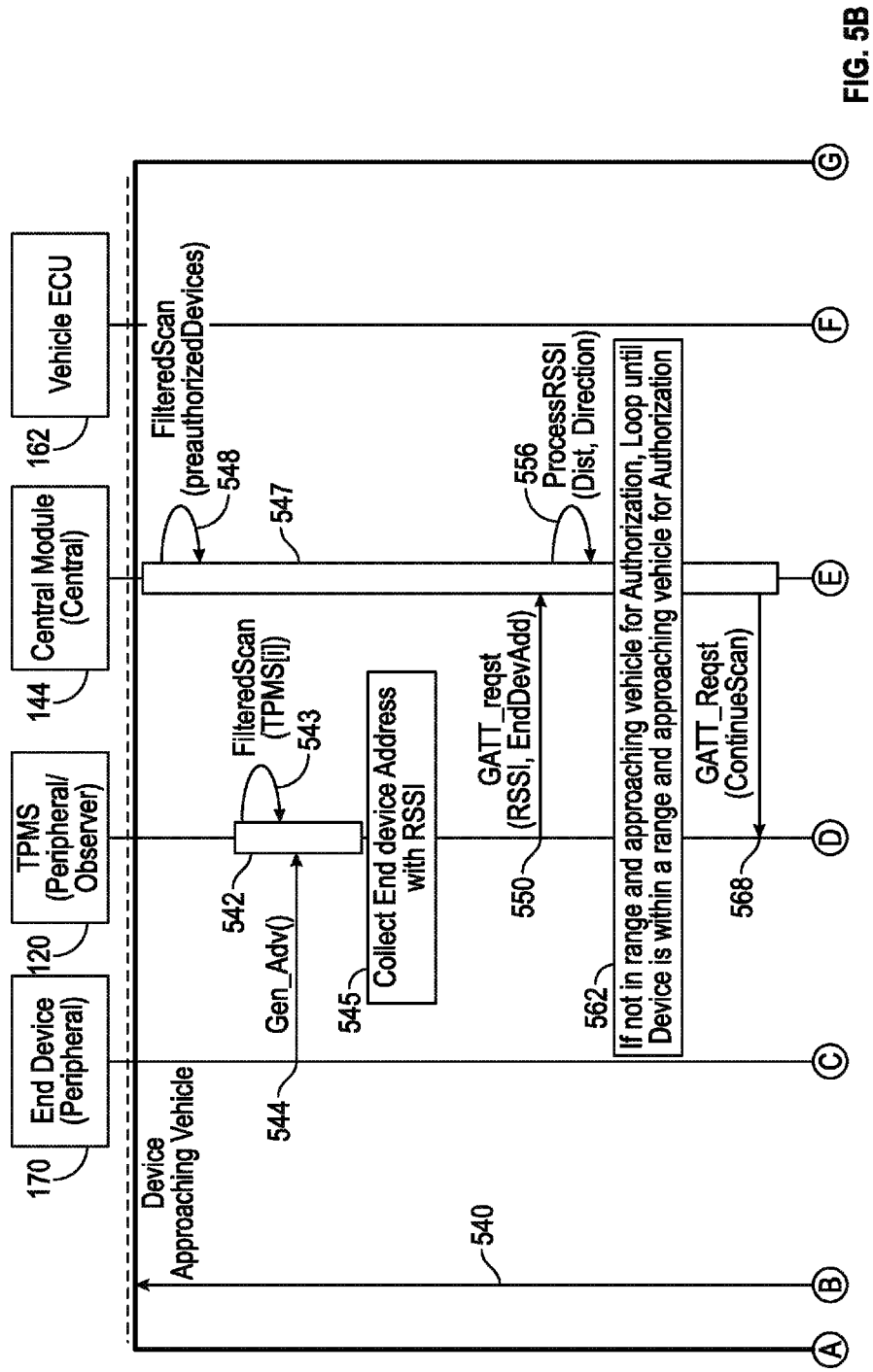
Figure 5C:
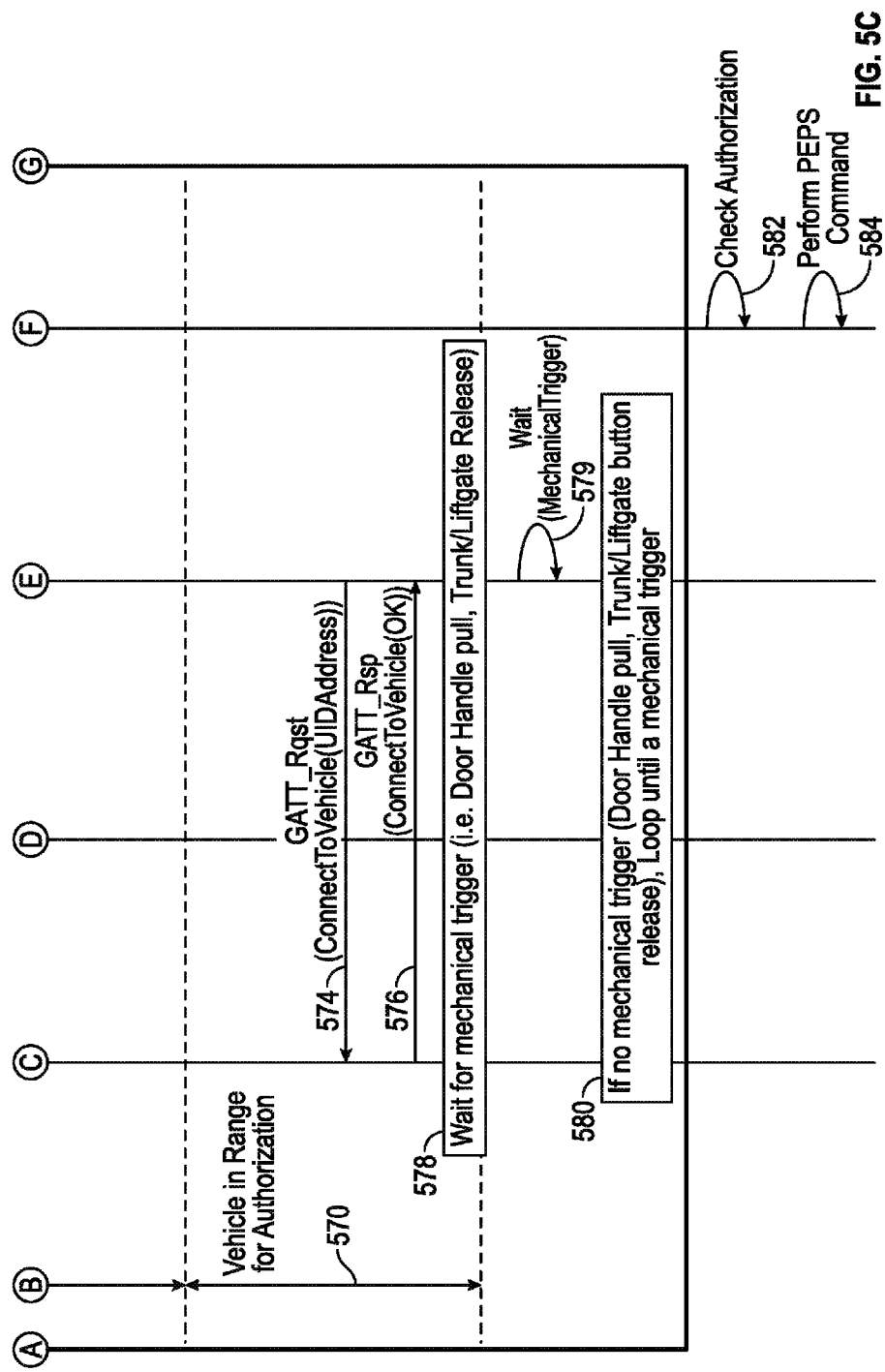

FIGS. 5A through 5C illustrate yet another method in accordance with some of the disclosed embodiments. In FIGS. 5A through 5C, the end device 170 has a peripheral role, the sensors 120 have both a peripheral role and an observer role, and the central module 144 has a central role. The various communications and processing steps at 510-539 are identical to those described above with respect to 310-339 of FIG. 3A, and for sake of brevity a description of those steps will not be repeated. The portion of the method illustrated in FIGS. 5B and 5C differs from the portion of the method illustrated in FIGS. 3B and 3C in the following ways.

Referring now to FIG. 5B, at 540, a search process begins for end devices that might be approaching the vehicle. At 542, the sensors 120 continuously perform a filtered scan for advertisement messages transmitted from the end device 170 (that might be approaching the vehicle). The continuous nature of the scanning performed at 542 is indicated by the loop 543 of FIG. 5B. As the sensors 120 receive one or more general advertisement messages transmitted from the end device 170 at 544, the sensors 120 will determine signal strength information for each advertisement message, as well as the address of the end device 170 that transmitted the advertisement message(s) as indicated at 545.

At 547, the central module 144 scans for GATT request messages transmitted from the sensors 120 over one of the data channels. The GATT request messages communicated from the sensors 120 include the measured signal strength information (e.g., a RSSI) associated with the end device 170 and an address of the end device 170. At block 547, the loop 548 indicates that the central module 144 is continuously performing the scan for GATT request messages transmitted from the sensors 120. Although FIG. 5B illustrates communication of a single GATT request message, it will be appreciated that each of the sensors 120 transmits its own separate GATT request message(s) to the central module 144, and that the signal strength information in each of these messages can be different since it's likely that each sensor 120 will observe different received signal strength for signals received from the same end device.

Upon receiving GATT request messages that were communicated at 550 over one of the data channels, the central module 144 processes the signal strength information (e.g., a RSSI) from the GATT request messages, as indicated at 556, to determine the distance of the end device 170 from the vehicle and whether it is within range for authorization, and also the direction that the end device 170 is approaching the vehicle from.

When the central module 144 determines that the end device 170 is not in range for authorization, the communications and processing at 542-556 repeats. This will continue until the end device 170 is determined to be within range for authorization.

When the central module 144 determines, based on the processed signal strength information, that the end device 170 is not in range for authorization, the method will then proceed to 568, where the central module 144 communicates GATT request messages to each of the sensors 120 over one of the data channels. Each GATT request message (communicated at 568) includes a request for the sensor 120 to continue scanning for approaching end devices including the end device 170 and acquire signal strength information for that end device 170. In one embodiment the GATT request messages can be encrypted communication to provide additional security. As above, although FIG. 5B illustrates communication of a single GATT request message at 568, it will be appreciated that the central module 144 transmits separate GATT request messages to each of the sensors 120.

Referring now to FIG. 5C, having determined that the end device 170 is within a range of the vehicle that is required for authorization, an authorization process begins at 570. The authorization process performed at 570 can vary depending on the implementation. In general, during the authorization process at 570, the central module 144 and the end device 170 exchange messages per an authorization process to confirm whether the end device 170 is authorized by the central module 144 to trigger passive entry passive start functions.

In one non-limiting implementation, at 574, the central module 144 communicates GATT request messages to the end device 170 (over one of the data channels) to indicate that the end device 170 is permitted to connect to the vehicle, and at 576, upon receiving the GATT request message, the end device 170 communicates a GATT response message back to the central module 144 (over one of the data channels) to acknowledge that a connection is present between that end device 170 and the central module 144 and that the end device 170 is now connected to the central module 144 of the vehicle as an authorized device. At this point, the central module 144 can begin an authorization process, as described in greater detail above with respect to FIG. 3C. As with FIG. 3C, the message exchange at phase 570 is exemplary and in other embodiments can include any known authorization process, and can include additional messages exchanged between the central module 144 and the end device 170 that are not illustrated for sake of clarity.

Following the authorization process at 570, the processing at 578, 579, 580, 582 and 584 is identical to that described above with respect to 378, 379, 380, 382 and 384, and for sake of brevity a description of the steps will not be repeated.

FIG. 6 is a diagram that provides a mapping of RF channels to BLUETOOTH® Low Energy (BLE) data channels and BLUETOOTH® Low Energy (BLE) advertising channels 410. BLE technology operates in the same spectrum range (2402-2480 MHz) as Classic BLUETOOTH® technology. However, as illustrated in FIG. 6, BLE communicates over a different set of channels. Instead of Classic BLUETOOTH® technology's seventy-nine RF channels each having a bandwidth of 1 MHz, BLE technology has forty RF channels, each having a bandwidth of 2 MHz. It is noted that the BLE data channels are not labeled with reference numbers for sake of clarity, but are all of the channels that are not marked 410-1, 410-B, 410-C. More specifically, the BLE data channels are channels zero (0) through ten (10) and eleven (11) through thirty-six (36), and the BLE advertising channels 410 are channels thirty-six (37), thirty-eight (38) and thirty-nine (39), which are centered at 2402 MHz, 2426 MHz, and 2480 MHz, respectively.

Data communication between BLE devices occurs in the 37 pre-specified data channels. All data transmissions occur in connection events in which a point-to-point connection is established between the master device and a slave device. In the existing BLE protocol, a slave device cannot provide data through BLE communication to any other device than the master device to which it is connected.

BLE advertising channels 410 are typically used by devices to advertise their existence and capabilities. Communications that are broadcast over the advertising channels 410 are unidirectional and connectionless. BLE technology uses the three advertising channels 410 to minimize a device's time on air to search for other devices or promote its own presence to devices that might be looking to make a connection. This means BLE technology has to switch "on" for just 0.6 to 1.2 milliseconds to scan for other devices. In comparison, Classic BLUETOOTH® technology uses 32 channels, and requires 22.5 milliseconds to scan its 32 channels. Consequently, BLE technology uses 10 to 20 times less power than Classic BLUETOOTH® technology to locate other radios. On other hand, the amount of data that can be transmitted over the BLE advertising channels 410 in this connectionless broadcast mode is very limited in comparison to the amount of data that can be communicated over BLE data channels.

Once connected, a BLE device switches to one of the 37 data channels used for data communication between BLE enabled devices. Data communication (also referred to as data connection transmissions) occur in what are called connection events. During the short data transmission period the BLUETOOTH® radio switches between channels in a pseudo-random pattern using Adaptive Frequency Hopping (AFH) technology.

As described above, in accordance with some of the disclosed embodiments, the BLE advertising channels 410 are used to communicate signal strength information (e.g., RSSI) and address information between the sensor 120, the central module 144 and the end device 170 as described above.

For sake of completeness, the data structure of a BLE packet will now be described. Although the BLE link layer has only one packet format used for both advertising channel packets and data channel packets, an example will now be described with reference to FIG. 7, where the data structure is described as being that of advertising channel packet 700.

Figure 7:
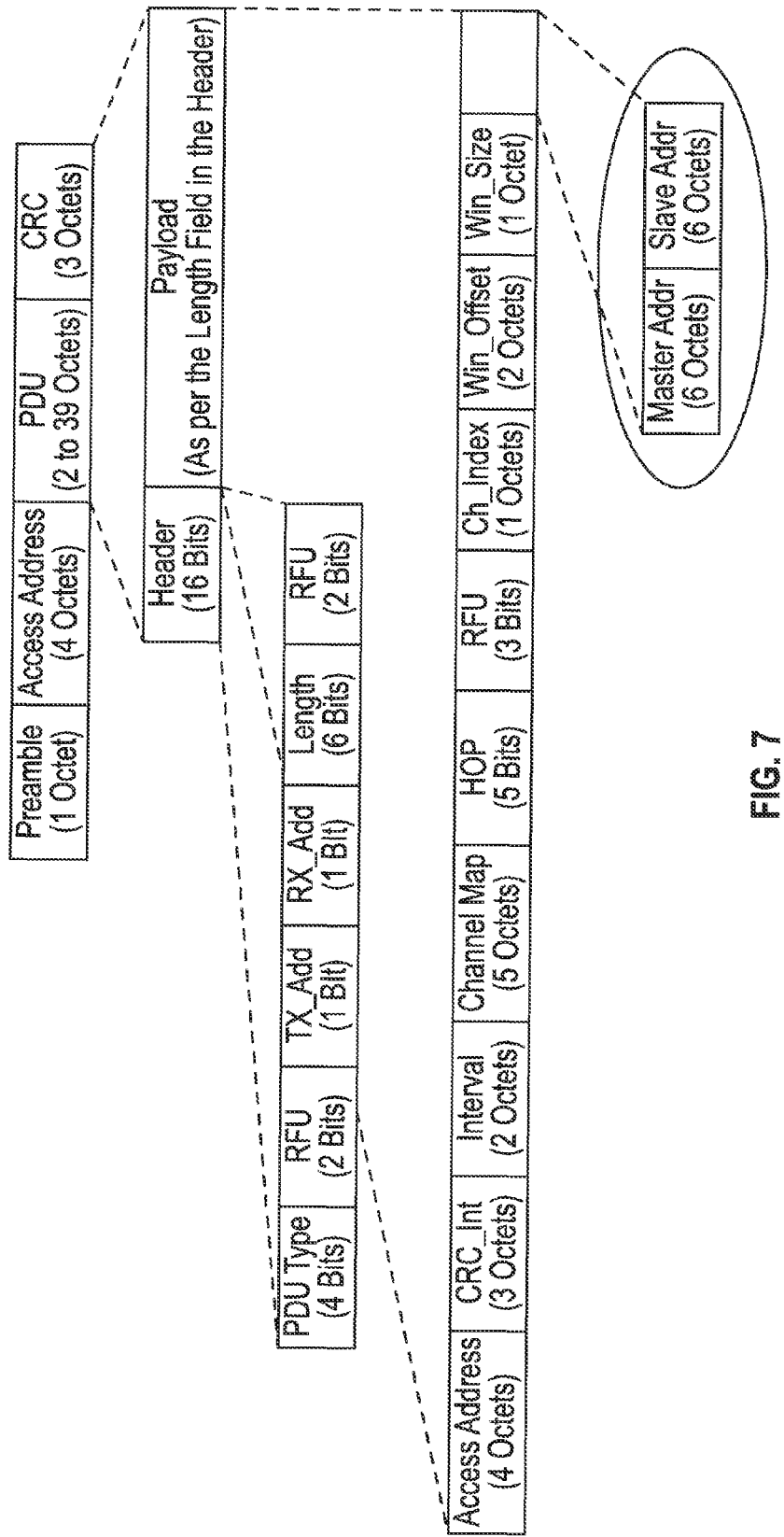
FIG. 7 is an example data structure of advertising channel packet in accordance to at least one embodiment.

FIG. 7 is an example data structure of advertising channel packet 700 in accordance to at least one embodiment.

Each packet consists of four fields: a preamble, an Access Address, a protocol data unit (PDU), and a cyclic redundancy code (CRC). The preamble is one (1) octet and the Access Address is four (4) octets. The PDU can be from two (2) up to thirty-nine (39) octets in length. The CRC is three (3) octets.

The Access Address for all advertising channel packets is set to the hex value 0x8E89BED6.

The advertising channel PDU has a 16-bit header and a variable size payload. The PDU Type field of the advertising channel PDU that is contained in the header, indicates the PDU type. The TxAdd and RxAdd fields of the advertising channel PDU that are contained in the header, contain information specific to the PDU type defined for each advertising channel PDU. The Length field of the advertising channel PDU header indicates the payload field length in octets, which may be 6 to 37 octets.

The Payload fields in the advertising channel PDUs are specific to the PDU Type. For the advertising channel packet 700, the example payload field may include the following fields:

AccessAddress—four (4) octets that specify the connection's access address.

CRCInit—three (3) octets that specify an initialization value for a CRC calculation.

Interval—two (2) octets that specify a connection interval parameter value.

Channel Map—five (5) octets that specify a channel map indicating used and unused data channels; every channel is represented with a bit positioned as per the data channel index.

Hop—five (5) bits that indicates a hop increment used in the data channel selection algorithm, and has a random value in the range of 5 to 16.

Reserved for Future Use (RFU)—is an unused field that is three bits that are reserved for future use, and in one embodiment, can carry signal strength information (e.g., an RSSI value that was determined by the sender based on a signal received from another entity).

Channel Index—one (1) octet that indicates an unmapped data channel index for the connection event advertised whose start time is indicated with the Win_Offset parameter.

Win_Offset—two (2) octets that specify a start time of the connection event start transmission window.

Win_Size—one (1) octet that indicates the connection event start transmission window size.

Additionally there may be other parameters in the advertising channel packet 700 that are considered useful for connection identification purposes. The PDU may, as an example, contain addresses of either or both the master and slave devices of the connection:

MasterAddress—six (6) octets that specify the address of the master device in the connection.

SlaveAddress—six (6) octets that specify the address of the slave device in the connection.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A passive entry passive start system, comprising:
    an end device; and
    a vehicle, comprising:
        a plurality of sensors; and
        a central module communicatively coupled to the end device and to the sensors via short-range wireless connections, the central module being configured to: perform a filtered scan for an advertisement message transmitted from the end device over an advertising channel, and, when the end device is detected during scanning, to transmit a discovery message to each of the sensors that indicates that the sensors are to begin scanning for a first advertisement message transmitted from the end device over an advertising channel, wherein the advertising channels are connectionless and do not require a connection to be established for communications to take place over the advertising channels;
        wherein each sensor is configured to: determine signal strength information for the first advertisement message, and to transmit a reporting message to the central module that comprises the signal strength information and a first address for the end device;
        wherein the central module is further configured to: determine, based on signal strength information measured by and provided from the sensors, whether the end device is within range for authorization; and control performance of at least one passive entry passive start (PEPS) function at the vehicle, when the end device is determined to be within range for authorization.

2. A passive entry passive start system according to claim 1, wherein the central module is further configured to:
    determine the distance of the end device from the vehicle based on the signal strength information from reporting messages received from the sensors, and to determine, based on the distance of the end device from the vehicle, whether the end device is within range for authorization.

3. A passive entry passive start system according to claim 2, when the end device is determined to be within range for authorization, wherein the central module is configured to initiate an authorization process with the end device by exchanging messages over a data channel with the end device.

4. A passive entry passive start system according to claim 3, wherein the data channel is connection-oriented such that a connection must be established before communications take place over the data channel.

5. A passive entry passive start system according to claim 1, wherein the sensors are configured to transmit advertisement messages over an advertising channel, wherein each advertising channel is connectionless and does not require a connection be established for communications to take place over that advertising channel,
    wherein the end device is configured to perform a filtered scan for advertisement messages transmitted from the sensors over an advertising channel, to determine the signal strength information from the advertisement messages, and to transmit a reporting message to the central module that comprises the signal strength information corresponding to each sensor; and
    wherein the central module is configured to: determine, based on signal strength information provided in the reporting message from the end device, the distance of the end device from the vehicle, and to determine, based on the distance of the end device from the vehicle, whether the end device is within range for authorization; and
    when the end device is determined to be within range for authorization, wherein the central module is configured to initiate an authorization process with the end device by exchanging messages over a data channel with the end device; and to control performance of at least one passive entry passive start (PEPS) function at the vehicle when the end device has been authorized.

6. A method, comprising:
    establishing, during an initial wireless connection setup phase, wireless connections between a central module disposed within a vehicle and a plurality of sensors disposed within the vehicle;
    performing, at the central module, a filtered scan for an advertisement message transmitted from an end device over an advertising channel, wherein the advertisement message comprises a first address for the end device;
    transmitting, from the central module to each of the sensors when the central module receives the advertisement message from the end device, a discovery message that indicates that the end device has been detected and that the sensors are to begin scanning for a first advertisement message transmitted from the end device over an advertising channel, wherein each discovery message comprises the first address for the end device that was discovered during the filtered scan, wherein the advertising channel is connectionless and does not require a connection to be established for communications to take place over the advertising channels;
    performing, at each of the sensors, a filtered scan for the first advertisement message transmitted from the end device that comprises the first address for the end device, wherein the first advertisement message is communicated over an advertising channel;
    at each sensor, upon receiving a first advertisement message from the end device that comprises the first address: determining, at each sensor, signal strength information for the first advertisement message; and generating and transmitting, from each sensor, a reporting message to the central module that comprises the signal strength information and the first address for the end device;
    performing, at the central module, another filtered scan for reporting messages transmitted from the sensors, wherein each of the reporting messages comprise the first address for the end device;
    receiving one or more of the reporting messages at the central module;

determining, at the central module based on signal strength information, whether the end device is within range for authorization; and when the end device is determined to be within range for authorization, performing at least one passive entry passive start (PEPS) function at the vehicle.

7. A method according to claim 6, wherein the determining step comprises:

determining, at the central module based on signal strength information, a distance of an end device from the vehicle; and determining, at the central module based on the distance of the end device from the vehicle, whether the end device is within range for authorization.

8. A method according to claim 7, wherein the step of determining, at the central module disposed within the vehicle based on signal strength information, the distance of the end device from the vehicle, comprises:

processing the signal strength information from each of the reporting messages to determine the distance of the end device from the vehicle and a direction that the end device is approaching the vehicle from.

9. A method according to claim 8, when the end device is determined not to be within range for authorization, further comprising:

until the end device is determined to be within range for authorization, repeating the steps of:

performing, at each of the sensors, a filtered scan for the first advertisement message transmitted from the end device that comprises the first address for the end device, wherein the first advertisement message is communicated over an advertising channel;

at each sensor, upon receiving a first advertisement message from the end device that comprises the first address: determining, at each sensor, signal strength information for the first advertisement message;

generating and transmitting, from each sensor, a reporting message to the central module that comprises the signal strength information and the first address for the end device;

performing, at the central module, another filtered scan for reporting messages transmitted from the sensors, wherein each of the reporting messages comprise the first address for the end device;

receiving one or more of the reporting messages at the central module; and processing the signal strength information from each of the reporting messages to determine the distance of the end device from the vehicle and a direction that the end device is approaching the vehicle from.

10. A method according to claim 6, when the end device is determined to be within range for authorization, and prior to performing at least one passive entry passive start (PEPS) function at the vehicle, further comprising:

initiating an authorization process with the end device by exchanging Generic Attribute Profile (GATT) messages over a data channel with the end device.

11. A method according to claim 10, wherein the advertising channels are connectionless and do not require a connection be established for communications to take place over the advertising channels, and wherein the data channel is connection-oriented such that a connection must be established before communications take place over the data channel.

12. A method according to claim 10, wherein initiating the authorization process by exchanging GATT messages over a data channel with the end device, comprises the steps of:

transmitting, from the end device to the central module, a GATT request message over a data channel to request a connection with the central module, wherein the GATT request message comprises an address of the end device;

transmitting, from the central module to the end device, a GATT response message over a data channel to confirm that the end device is connected to the central module;

starting a timer at the central module that specifies a timeout period that the central module will wait for a trigger event to occur;

when the trigger event does not occur within the timeout period specified by the timer, cancelling authorization at the central module will cancel the authorization; and when the trigger event does occur within the timeout period specified by the timer, determining at an electronic control unit (ECU) of the vehicle whether the end device is authorized to access the vehicle, and upon determining that the end device is authorized to access the vehicle, executing processing at the electronic control unit (ECU) to cause the at least one PEPS function to be performed to allow for vehicle access.

13. A method according to claim 10, after the central module determines, based on the distance of the end device from the vehicle, that the end device is within range for authorization, further comprising the steps of:

transmitting, from the central module to each of the sensors, wireless connection request messages; and upon receiving one of the wireless connection request messages, at each of the sensors, transmitting a wireless connection response message back to the central module to acknowledge that a wireless connection has been established between that particular sensor and the central module; and transmitting, from the central module to each of the sensors that the central module has established a wireless connection with, a GATT request message over a data channel, wherein each of the GATT request messages comprises a request for the sensor to continue scanning for the end device and acquire signal strength information for the end device.

14. A method according to claim 13, after transmitting, from the central module to each of the sensors that the central module has established a wireless connection with, a GATT request message over a data channel, further comprising the steps of:

transmitting, from the central module to the end device, a connection request message over an advertising channel to request a wireless connection to the vehicle; and transmitting, from the end device to the central module, a connection response message over an advertising channel to confirm that the end device is connected to the vehicle via the wireless connection.

15. A method according to claim 6, wherein the end device has a peripheral role and the central module has a central role, and wherein prior to the step of performing, at each of the sensors, a filtered scan for a first advertisement message transmitted from the end device, further comprising:

switching, at each of the sensors, from a peripheral role to an observer role; and prior to the step of generating and transmitting a reporting message that comprises the signal strength information and the first address for the end device, further comprising:

switching, at each of the sensors, from the observer role to the peripheral role.

16. A method according to claim 6, wherein the reporting messages transmitted from the sensors are general advertisement messages transmitted from the sensors over an advertising channel.

17. A method according to claim 6, wherein the reporting messages transmitted from the sensors are GATT messages transmitted from the sensors over a data channel.

18. A method according to claim 6, wherein the step of establishing the wireless connections between the central module and the sensors during the initial wireless connection setup phase, comprises:
- performing, at the central module, a filtered scan to detect advertisement messages transmitted by the sensors on advertising channels, wherein each advertising message transmitted by a sensor includes an identifier for the particular sensor;
- establishing a wireless connection between the central module and each of the sensors that are detected during the filtered scanning; and
- after establishing the wireless connections between the central module and each of the sensors, entering, at each of the sensors, a listening mode until the sensors receive a message from the central module to transition to an active communication mode.

19. A system comprising a vehicle and an end device, the vehicle comprising:
- a plurality of tires each having a sensor mounted therein, each of the sensors comprising a chipset and an antenna; and
- a central module comprising another chipset and another antenna, the central module being communicatively coupled to the end device and to the sensors via wireless connections, the central module being configured to: perform a filtered scan for an advertisement message transmitted from the end device over an advertising channel, and, when the end device is detected during scanning, to transmit a discovery message to each of the sensors that indicates that the sensors are to begin scanning for a first advertisement message transmitted from the end device over an advertising channel, wherein the advertising channel is connectionless and does not require a connection to be established for communications to take place over the advertising channel;
- wherein each sensor is configured to: determine signal strength information for the first advertisement message, and to transmit a reporting message to the central module that comprises the signal strength information and a first address for the end device;
- wherein the central module is further configured to: determine, based on signal strength information provided from the sensors, a distance of the end device from the vehicle and whether the end device is within range for authorization based on the distance of the end device from the vehicle; and control performance of at least one passive entry passive start (PEPS) function at the vehicle when the end device is determined to be within range for authorization.

* * * * *